US012619369B2

(12) United States Patent
Lim et al.

(10) Patent No.: US 12,619,369 B2
(45) Date of Patent: May 5, 2026

(54) MEMORY TRANSACTION PARAMETER SETTINGS

(71) Applicant: Arm Limited, Cambridge (GB)

(72) Inventors: Seow Chuan Lim, Cambridge (GB); Steven Douglas Krueger, Austin, TX (US)

(73) Assignee: Arm Limited, Cambridge (GB)

( * ) Notice: Subject to any disclaimer, the term of this patent is extended or adjusted under 35 U.S.C. 154(b) by 69 days.

(21) Appl. No.: 18/664,586

(22) Filed: May 15, 2024

(65) Prior Publication Data

US 2024/0302986 A1 Sep. 12, 2024

Related U.S. Application Data

(63) Continuation of application No. 17/330,722, filed on May 26, 2021, now Pat. No. 12,001,705.

(51) Int. Cl.
*G06F 3/06* (2006.01)
(52) U.S. Cl.
CPC .......... *G06F 3/0644* (2013.01); *G06F 3/0604* (2013.01); *G06F 3/0631* (2013.01); *G06F 3/0659* (2013.01); *G06F 3/0673* (2013.01)
(58) Field of Classification Search
CPC .... G06F 3/0644; G06F 3/0604; G06F 3/0631; G06F 3/0659; G06F 3/0673
See application file for complete search history.

(56) References Cited

U.S. PATENT DOCUMENTS

| | | | | | |
|---|---|---|---|---|---|
| 5,974,567 | A | * | 10/1999 | Dickson, Jr. ........ | G06F 11/2284 |
| | | | | | 714/36 |
| 11,080,192 | B2 | * | 8/2021 | Tatsumi .............. | G06F 12/0848 |
| 11,662,931 | B2 | * | 5/2023 | Lim ...................... | G06F 3/0604 |
| | | | | | 711/154 |
| 2003/0212883 | A1 | * | 11/2003 | Lee ........................ | G06F 9/5077 |
| | | | | | 713/1 |
| 2008/0120515 | A1 | * | 5/2008 | Ritz ..................... | G06F 11/2043 |
| | | | | | 713/601 |
| 2014/0310706 | A1 | * | 10/2014 | Bruso ................. | G06F 9/45533 |
| | | | | | 718/1 |
| 2018/0203609 | A1 | * | 7/2018 | Krueger .................. | G06F 9/467 |

(Continued)

OTHER PUBLICATIONS

U.S. Appl. No. 17/330,722, filed May 26, 2021, Lim et al.

(Continued)

*Primary Examiner* — Tim T Vo
(74) *Attorney, Agent, or Firm* — NIXON & VANDERHYE P.C.

(57) ABSTRACT

An apparatus includes processing circuitry that performs data processing in response to instructions of a software execution environment. Configuration storage circuitry stores a set of memory transaction parameters in association with a partition identifier, and configuration application circuitry applies the set of memory transaction parameters with respect to memory transactions issued by the software execution environment that identifies the partition identifier. The memory transaction parameters comprise a minimum target allocation and a maximum target allocation of a storage capacity of at least part of a memory system in handling the memory transaction that identifies the partition identifier.

15 Claims, 14 Drawing Sheets

(56)                    References Cited

U.S. PATENT DOCUMENTS

| 2020/0012602 A1* | 1/2020 | Zhao | ......................... | G06F 17/11 |
| 2020/0034365 A1* | 1/2020 | Martin | .............. | G06F 16/24554 |
| 2021/0073131 A1* | 3/2021 | Krueger | .................. | G06F 9/467 |
| 2022/0083243 A1* | 3/2022 | Muchherla | ............. | G11C 16/10 |

OTHER PUBLICATIONS

Office Action dated Aug. 26, 2022 for U.S. Appl. No. 17/330,722, 27 pages.
Final Office Action dated Jan. 23, 2023 for U.S. Appl. No. 17/330,722, 25 pages.
Advisory Action dated May 10, 2023 for U.S. Appl. No. 17/330,722, 4 pages.
Office Action dated Oct. 2, 2023 for U.S. Appl. No. 17/330,722, 16 pages.

* cited by examiner

200

| Frame number | V | Permissions (Read/Write) | Caching | M | PBHA |
|---|---|---|---|---|---|
| 202 | 204 | 206 | 208 | 210 | 212 |

|  | MMSEL | INTPARTID |
|---|---|---|
| PART ID = 0 | 00001 | 4 |
| PART ID = 1 | 00110 | 1 |
| PART ID = 2 | 01000 | 1 |

| COMPARISON CIRCUIT | MASK | MATCH | MM INTPART ID |
|---|---|---|---|
| 0 | 11111 | 00000 | 5 |
| 1 | 10011 | 10001 | 3 |
| 2 | 10011 | 10000 | 2 |
| 3 | 10000 | 00000 | 2 |
| 4 | 10000 | 01010 | 7 |
| ⋮ | ⋮ | ⋮ | ⋮ |

PROCESS 2121 =   PART ID = 1

INITIAL INTPARTID = 1, MMSEL = 00110

SIDEBAND = 10101

TEST COMPARISON CIRCUIT 1 – MASK = 10011

TEST COMPARISON CIRCUIT 2 – MASK = 10011

10101&10011 = 10001 → MATCH ∴ OVERRIDE WITH MMINTPARTID=3

10101&10011 = 10001 → NO MATCH

PROCESS 16 =   PART ID = 2

INITIAL INTPARTID = 1, MMSEL = 01000

SIDEBAND = 10100

TEST COMPARISON CIRCUIT 3 – MASK = 10000

10100&10000 = 10000 → NO MATCH ∴ NO OVERRIDE

| IntPartID | CMAX | CPBM | EN | CMAX ASC | CMIN | HL | CTL |
|---|---|---|---|---|---|---|---|
| 0 | 10% | 0xF4C1 | 1 | 25% | 1% | 0 | 0xF12 |
| 1 | 30% | 0x11FF | 0 | 50% | 5% | 0 | 0xCCC |
| 2 | 35% | 0x4FF4 | 1 | 12.5% | 35% | 1 | 0x117 |
| ⋮ | | | | | | | |
| N | 50% | 0x5511 | 0 | 25% | 40% | 1 | 0xFA1 |

FIG. 11

<u>Allocation Decision</u>

| New line IntPARTID's Occupancy | | New line IntPARTID's HL | Cache way has free space, or any way has IntPARTID that is disabled. | CMAXASC reached | All IntPARTID Occu These indicates that there | |
|---|---|---|---|---|---|---|
| ≥ CMIN | ≥ CMAX | | | | ≤ CMIN | > |
| No | X | X | Yes | No | X | |
| | | | No | No | X | |
| | | | No | No | X | |
| | | | No | No | Yes | |
| | | | X | Yes | X | |
| Yes | No | X | Yes | No | X | |
| | | | No | No | X | |
| | | | No | No | X | |
| | | | No | No | Yes | |
| | | | X | Yes | X | |
| Yes | Yes | No | Yes | No | X | |
| | | | No | No | X | |
| | | | No | No | X | |
| | | | No | No | Yes | |
| | | | X | Yes | X | |
| Yes | Yes | Yes | X | No | X | |
| | | | X | Yes | X | |

FIG. 12

Table

| pancy of ways within a cache set. are ways in this set in the class below | | Allocation policy at way selection in a target set. (Owned lines are lines with the same IntPARTID as new line) | |
|---|---|---|---|
| CMIN & ≤ CMAX | > CMAX | | |
| X | X | Allocate to empty way or ways with disabled IntPARTID | (A) |
| X | Yes | Replace way within > CMAX group | |
| Yes | No | Replace way within any > CMIN & ≤ CMAX group | |
| No | No | Replace any way | |
| X | X | Replace owned line only | |
| X | X | Allocate to empty way or ways with disabled IntPARTID | |
| X | Yes | Replace way within > CMAX group | |
| Yes | No | Replace way within any > CMIN & ≤ CMAX group | |
| No | No | Replace owned line only, else bypass | |
| X | X | Replace owned line only | |
| X | X | Allocate to empty way or ways with disabled IntPARTID | |
| X | Yes | Replace way within > CMAX group | |
| Yes | No | Replace owned line only, else bypass | |
| No | No | Replace owned line only, else bypass | (B) |
| X | X | Replace owned line only | |
| X | X | Replace owned line only, else bypass | |
| X | X | Replace owned line only | |

FIG. 12 (Continued)

MEMORY TRANSACTION PARAMETER SETTINGS

CROSS-REFERENCE

This application is a continuation of U.S. application Ser. No. 17/330,722, filed May 26, 2021, the entire contents of which are incorporated herein by reference in this application.

TECHNICAL FIELD

The present disclosure relates to memory systems as might be used in a data processing apparatus.

DESCRIPTION

In a data processing apparatus, a software execution environment may cause memory transactions to be issued to a memory system. Such memory transactions can indicate a particular partition to be used, which affects the resource usage of the memory system in handling those memory transactions.

SUMMARY

Viewed from a first example configuration, there is provided an apparatus comprising: processing circuitry configured to perform data processing in response to instructions of a software execution environment; configuration storage circuitry configured to store a set of memory transaction parameters in association with a partition identifier; and configuration application circuitry configured to apply the set of memory transaction parameters in respect of memory transactions issued by the software execution environment that identifies the partition identifier, wherein the memory transaction parameters comprise a minimum target allocation of a resource used by a memory system in handling the memory transaction that identifies the partition identifier.

Viewed from a second example configuration, there is provided a method comprising: performing data processing in response to instructions of a software execution environment; storing a set of memory transaction parameters in association with a partition identifier; and applying the set of memory transaction parameters in respect of memory transactions issued by the software execution environment that identifies the partition identifier, wherein the memory transaction parameters comprise a minimum target allocation of a resource used by a memory system in handling the memory transaction that identifies the partition identifier.

Viewed from a third example configuration, there is provided an apparatus comprising: processing circuitry configured to perform data processing in response to instructions of a software execution environment; configuration storage circuitry configured to store a set of memory transaction parameters and associated partition identifiers, wherein the memory transaction parameters comprise resource allocations for handling transactions that identify the associated partition identifier; configuration application circuitry to perform the resource allocations, wherein the memory transaction parameters comprise an enable setting; and the configuration application circuitry is configured to inhibit the resource allocations based on the enable setting.

Viewed from a fourth example configuration, there is provided a method comprising: performing data processing in response to instructions of a software execution environment; storing a set of memory transaction parameters and associated partition identifiers, wherein the memory transaction parameters comprise resource allocations for handling transactions that identify the associated partition identifier; performing the resource allocations, wherein the memory transaction parameters comprise an enable setting; and the resource allocations are inhibited based on the enable setting.

BRIEF DESCRIPTION OF THE DRAWINGS

The present invention will be described further, by way of example only, with reference to embodiments thereof as illustrated in the accompanying drawings, in which:

FIG. 8 shows a worked example for two processes; and

FIG. 11 shows an example of configuration parameters that can be applied to partitions in the memory system;

FIG. 12 presents an allocation decision table, that indicates how particular resources are allocated when a partition attempts to store data in the memory system (e.g. in a cache)

DESCRIPTION OF EXAMPLE EMBODIMENTS

Figure 1:
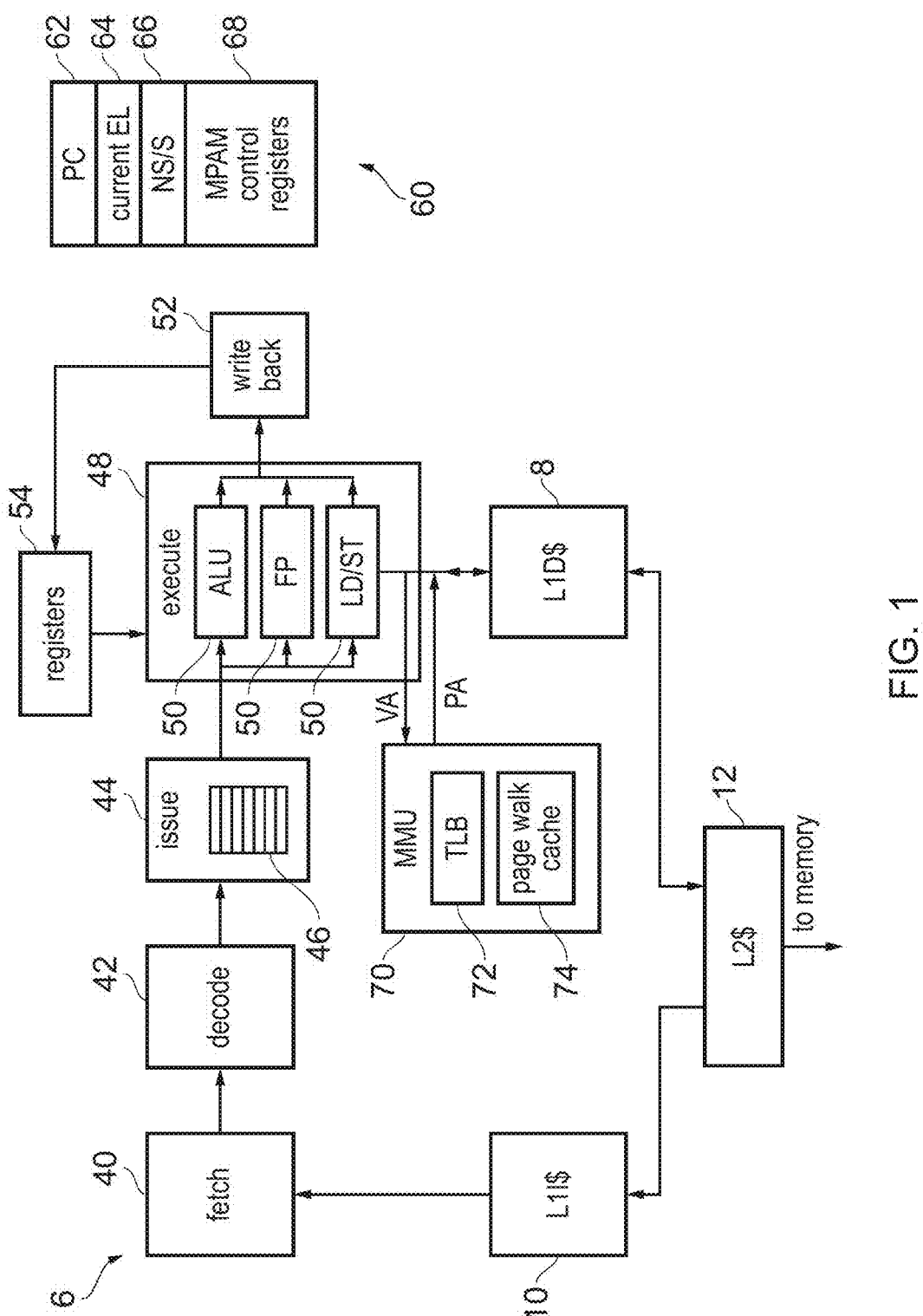
FIG. 1 schematically illustrates an example of a processing unit.

Before discussing the embodiments with reference to the accompanying figures, the following description of embodiments is provided.

In accordance with one example configuration there is provided an apparatus comprising: processing circuitry configured to perform data processing in response to instructions of a software execution environment; configuration storage circuitry configured to store a set of memory transaction parameters in association with a partition identifier; and configuration application circuitry configured to apply the set of memory transaction parameters in respect of memory transactions issued by the software execution environment that identifies the partition identifier, wherein the memory transaction parameters comprise a minimum target allocation of a resource used by a memory system in handling the memory transaction that identifies the partition identifier.

The software execution environments can cause memory transactions to take place—e.g. by accessing the memory system. Within the transaction, a partition identifier can be set. This corresponds with a particular set of memory transaction parameters that indicate how the memory system is to be used in handling the transaction for the identified partition. In these examples, the memory transaction parameters indicate a minimum target allocation of a resource of the memory system. The allocation is a target in that it is not guaranteed, but positive attempts are made to try and provide the minimum allocation where this is practicable. By providing a minimum, this can help to prevent thrashing of resources. Access latency can also be made more predictable.

There are a number of possible resources that the minimum target allocation could relate to. However, in some examples, the memory system comprises a cache; and the resource is a storage capacity of the cache. A cache can be provided as a way to access a small amount of frequently accessed (or soon to be accessed) data from a faster, smaller store than a main memory. However, due to its smaller size, only a limited amount of data can be stored. In these examples, the resource itself corresponds with storage capacity of the cache. The cache capacity can therefore be distributed among the partitions so that each partition has a certain proportion of the cache that they can use with limited (or no) interference from other partitions.

In some examples, the storage capacity of the cache is a number of ways of the cache that are assigned to be used. In, for instance, a set-associative cache, a particular item of data can be stored at one of a plurality of locations (known as ways). In these examples, different ways can be allocated to different partitions. For instance, one partition might be allocated two ways and another partition might be allocated a third way. A larger number of ways results in fewer replacements occurring within the cache. For instance, if an item of data can be stored in four different locations then replacement of existing data occurs only if all four of those locations are already used.

In some examples, the storage capacity of the cache is a number of lines of the cache that are assigned to be used. Typically a cache works by hashing a data item (either the content itself or its address) in order to determine a cache line into which the data item can be stored. Multiple ways might exist, which effectively duplicate each cache line (so multiple entries that produce the same cache value can all be stored). By changing the number of cache lines available to a partition, it becomes necessary to alter the hashing algorithm and increasing the number of cache lines can result in a smaller number of collisions occurring (multiple inputs hashing to the same value). This in turn decreases the chance with which data is to be replaced in the cache.

In some examples, the configuration application circuitry is configured to reserve the minimum target allocation of the resource of each set of memory transaction parameters in the configuration storage circuitry when every minimum target allocation of the resource of each set of memory transaction parameters in the configuration storage circuitry can be met. The configuration application circuitry therefore meets the minimum target allocation for each partition provided the minimum target can be met for each of the partitions. For instance, this might be achieved by denying some partitions the ability to have the maximum allocation of resources that they request. Where the minimum cannot be maintained for each of the partitions, some of the partitions may be allowed to drop below the minimum.

In some examples, the configuration application circuitry is configured to allocate, as a first preference, parts of the resource that are unused when additional parts of the resource are required for handling the memory transaction that identifies the partition identifier. When a partition requires the resource the resource is therefore to be allocated, a first priority of these examples is to allocate the resource where it is currently not allocated or are otherwise marked as being unused. Since these resources are not currently being used, there should be little to no detrimental effect to allocating these resources. Note that this allocation does not consider the resource allocation of other partitions. That is to say that regardless of the resource usage by other partitions, if one partition requests resources and resources are currently unused then they will be allocated to the requesting partition even if those resources might be better allocated to another partition. In due course, of course, those resources might be reallocated to a more deserving partition. However, in the first instance, the unused resources are allocated to the first requester. Note that the term "first preference" does not preclude the possibility that other, higher priority preferences might exist. Furthermore, the first preference might be dependent on other conditions being met. For instance, a "hard limit" might exist that prohibits a partition from having more than a certain allocation of the resource, even if the resources that would be allocated are otherwise unused.

In some examples, the memory transaction parameters comprise an enable setting; and parts of the resource that are allocated to another partition identifier whose enable setting indicates that the another partition identifier is disabled are unused. A resource might be classified as being unused if it is allocated to a partition whose enable setting indicates that it is disabled. In this case, resources already allocated to the disabled partition may preferentially be re-allocated to other partitions.

In some examples, the memory transaction parameters comprise a maximum target allocation of the resource used by the memory system in handling the memory transaction that identifies the partition identifier; and the configuration application circuitry is configured to allocate, as a second preference lower than the first preference, parts of the resource that are allocated to a further partition identifier whose usage of the resource exceeds its associated maximum target allocation. If it not possible to allocate unused resources, then resources that are allocated to a partition that exceeds its maximum target allocation are reallocated to the requesting partition. This allocation occurs regardless of the resources that have been allocated to other resources. That is, even if the requesting partition has itself exceeded its maximum target allocation, the resources would still be reallocated to the requesting partition. Of course, this does not preclude the possibility that the resources will then be reallocated to another partition. Note that although this allocation strategy is referred to as a second preference, it is possible that other priorities might interleave the first and second preferences.

In some examples, the configuration application circuitry is configured to allocate, as a third preference lower than the second preference, parts of the resource that are allocated to a still further partition identifier whose usage of the resource exceeds its associated minimum target allocation and is less than its associated maximum target allocation. Where resources cannot be reallocated from a partition that exceeds its maximum, a next preference is to reallocate resources from a partition whose resource allocation lies between its minimum and maximum points. In this way, a partition whose minimum resource usage is met makes a sacrifice in order to help a partition whose minimum resource usage is not met to meet its minimum target. In some examples, this reallocation only occurs if the requesting partition does not, itself, already exceeds its maximum target resource usage. That is one partition does not make a sacrifice if the result would be the requesting partition exceeding its maximum resource usage. Again, although this preference is described as a third preference, other allocation strategies might lie between the second and third preferences.

In some examples, the memory transaction parameters comprise an enable setting; and the configuration application circuitry is configured to inhibit the resource allocations based on the enable setting. Where a partition is 'disabled' according to the enable setting, resources are not allocated to that partition. If the partition should become enabled in the future, then resource allocation to the partition resumes.

In some examples, the configuration application circuitry is configured to disregard the minimum target allocation of the resource used by the memory system in handling the memory transaction that identifies the partition identifier, in response to the enable setting associated with the partition identifier indicating that the partition identifier is disabled. In these examples, when a partition is disabled then the minimum resource allocation for that partition is given no meaning (the minimum is treated as zero). Resources can therefore be reallocated from the disabled partition to other partitions (either as required or immediately via a background daemon).

In accordance with another example configuration, there is provided an apparatus comprising: processing circuitry configured to perform data processing in response to instructions of a software execution environment; configuration storage circuitry configured to store a set of memory transaction parameters and associated partition identifiers, wherein the memory transaction parameters comprise resource allocations for handling transactions that identify the associated partition identifier; configuration application circuitry to perform the resource allocations, wherein the memory transaction parameters comprise an enable setting; and the configuration application circuitry is configured to inhibit the resource allocations based on the enable setting.

The software execution environments can cause memory transactions to take place—e.g. by accessing the memory system. Within the transaction, a partition identifier can be set. This corresponds with a particular set of memory transaction parameters that indicate how the memory system is to be used in handling the transaction for the identified partition. In these examples, a particular partition can be marked as disabled by using an enable setting. This makes it possible to preserve the settings for a particular partition (thereby enabling the partition to be used in the same manner again in the future), without those settings being active or otherwise having an effect on the operation of the memory system.

In some examples, in response to the enable setting indicating that a given partition identifier is enabled, the configuration application circuitry is configured to allocate resources to be used by the given partition identifier. There are a number of possible consequences of a partition's enable setting being changed. In some examples, when a partition is marked as enabled, any resources that are earmarked for that partition can be allocated for handling transactions that identify the partition in question. Such resources could include a number of things. However, in some examples, the resources are a storage capacity of a cache in the memory system. For instance, a number of cache lines or ways that are allocated for handling transactions of a particular partition.

In some examples, in response to the enable setting indicating that a given partition identifier is disabled, the configuration application circuitry is configured to inhibit the allocation of resources to the given partition identifier. Thus, when a partition is marked as being disabled (i.e. not enabled), no resources are allocated for the handling of transactions that identify the particular partition.

In some examples, in response to the enable setting indicating that a given partition identifier is disabled, the configuration application circuitry is configured to reallocate resources that are allocated to the given partition identifier to another partition identifier; and the enable setting is configured to indicate that the another partition identifier is enabled. In these examples, instead of (or as well as) merely not allocating resources to a partition for which the enable setting indicates that the partition is disabled, the resources are actively removed for use by the said partition to allow for reallocation to other enabled partitions when needed. That is, allocated resources that are earmarked for handling transactions that identify the disabled partition are instead allocated for the handling of transactions that identify a different (enabled) partition. Such reallocation can occur in a number of ways. In some embodiments, the reallocation is performed when requests for resources are received. That is to say that, even if a partition is disabled, if no requests for the resources are received then the resources are not reallocated. In some embodiments, the reallocation is performed by the use of a background daemon that operates, for instance, in part of the memory system. Such a background daemon can be used to reallocate the resources to other partitions.

In some examples, the apparatus could also be configured as follows:

In accordance with one example configuration there is provided an apparatus comprising: processing circuitry configured to perform data processing in response to instructions of one of a plurality of software execution environments; first stage partition identifier remapping circuitry configured to remap a partition identifier specified for a memory transaction by a first software execution environment to a internal partition identifier to be specified with the memory transaction issued to at least one memory system component, wherein in response to a memory transaction to be handled, the at least one memory system component is configured to control allocation of resources for handling the memory transaction or manage contention for the resources in dependence on a selected set of memory system component parameters selected in dependence on the internal partition identifier specified by the memory transaction; the apparatus comprises second stage partition identifier remapping circuitry configured to dynamically override the internal partition identifier to be specified with the memory transaction based on a sideband input signal; and the first stage partition identifier remapping circuitry is further configured to indicate, for the partition identifier, whether the second stage partition identifier remapping circuitry is to be used The software execution environment, when it wishes to access the memory system component, causes a memory transaction to be issued to the memory system component. In the transaction, an identifier of the memory location to be accessed may be provided together with a partition identifier which represents the software execution environment. The partition identifiers are used to control how resources in the memory system are divided among the software execution environments. For instance, particular cache lines or ways of the cache could be restricted to being used by some execution environments, while other cache lines or ways of the cache could be restricted to being used by other execution environments. In this way the behaviour of one software execution environment can be inhibited from having a negative impact on another software execution environment. For instance, one software execution environment's extensive use of the cache does not cause cache entries from other software execution environments to be evicted because the cache is partitioned. In the above examples, a translation occurs between a partition identifier supplied by a software execution environment and an internal partition identifier which is used to physically partition the resources of the memory system. In this way, it is possible for a large number of partitions to exist, even though only a subset of those partitions can be 'active' at any time. It is, however, desirable for a software execution environment to be able to switch between partition identifiers. For instance, such switching might be necessary if one software execution environment is to share data with another software execution environment. Consequently, the above aspects provide a second stage remapping (e.g. translation) so that remapping can be achieved dynamically using a sideband signal. In these examples, the first stage remapping provides an initial (default) remapping from partition identifiers to initial internal partition identifiers. The second stage remapping circuitry, which can be activated or deactivated, makes it possible for this remapping to be overridden. The overriding that occurs is dependent on a sideband signal. Thus, even if the second stage remapping circuitry is selected to be active, the remapping is still dependent on the sideband signal to indicate whether (and potentially which) remapping is to be performed.

In some examples, a plurality of partition identifiers correspond to the internal partition identifier. There is therefore a many-to-one mapping between the partition identifiers and a internal partition identifier so that numerous partition identifiers correspond with a single (same) internal partition identifier. As should be clear from the preceding explanation, this correspondence might be reflected within the first stage conversion circuitry and be overridden by the second stage conversion circuitry.

In some examples, the first software execution environment is configured to access a plurality of internal partition identifiers including the internal partition identifier. One way in which a software execution environment such as the first software execution environment can share data with another software execution environment is by using one of the internal partitions in order to provide a 'shared' memory area in which data can be transferred between the two execution environments. Another situation in which the software execution environment may access a plurality of internal partition identifiers is according to the way that the data will be used. For example, consider a situation in which a software execution environment accesses data associated with a GPU whilst also accessing data that is associated with a CPU. In each of these cases, the software execution environment may wish to make use of cache. However, if the operation being performed with the GPU is cache intensive (e.g. is the GPU is generating frames), then data stored in the cache by the CPU is likely to be repeatedly evicted. Further complicating this is the fact that certain occasional operations performed by the GPU during this process benefit from being cached while other operations from the GPU should avoid being cached. For instance, a texture map generated by the GPU may benefit from being cached. Accordingly, the operation being performed by a single software execution environment in the form of an application may dictate how other resources of the system memory component are to be used. By using a sideband signal to indicate the type of operation to be performed, it is possible to control the usage of the memory system component.

In some examples, the first software execution environment is configured to access multiple of the plurality of internal partition identifiers while the apparatus remains in a user mode of operation. As a consequence of remaining in the user mode of operation, the first software execution environment does not make operating system/system level calls. The switching between the multiple partitions associated with the software execution environment therefore does not necessitate providing special instructions to the operating system or other equivalent management software. This can be efficient since the use of the operating system or management software to modify the partition being accessed can be time consuming at least in part, to the multiple context switches necessary in order to activate the operating system and then to reactivate the software execution environment.

In some examples, the second stage partition identifier remapping circuitry is configured to store a plurality of replacement internal partition identifiers; and the first stage partition identifier remapping circuitry is further configured to perform a selection of which of the plurality of replacement internal partition identifiers is to be considered to override the internal partition identifier. In these examples, a number of possible replacement internal partition identifiers are provided in the second stage partition identifier remapping circuitry. The first stage partition identifier remapping circuitry then selects one of the replacement internal partition identifiers being considered for overriding the internal partition identifier. Note that the consideration may still take into account the sideband signal for any replacement or overriding takes place. In some examples, the first stage partition identifier remapping circuitry identifies a number of possible internal partition identifiers to be considered, and the sideband signal is used to further reduce these candidates (e.g. to a single possible value).

In some examples, the second stage partition identifier remapping circuitry comprises a plurality of comparison circuits, each associated with one of the plurality of replacement internal partition identifiers and each storing mask and match values; and the first stage partition identifier remapping circuitry is configured to perform the selection of which of the comparison circuits is to be used. By providing a plurality of comparison circuits it is possible to consider a set of candidate internal partition identifier replacements in parallel.

In some examples, in response to a given comparison circuit being selected by the selection, the replacement internal partition identifier associated with the given comparison circuit is used to override the internal partition identifier in response to the match and mask values associated with the given comparison circuit corresponding with the sideband signal. The selection of a replacement internal partition identifier therefore involves, first, the selection of one of the comparison circuits and then masking of the side band signal with the mask value held by the comparison circuit and the result successfully matched with the match value help by the comparison circuit in order for the replacement internal partition identifier held by that comparison circuit to be provided.

In some examples, the first stage partition identifier remapping circuitry is configured to perform the selection based on a second stage identifier that identifies which of the plurality of replacement internal partition identifiers is to be considered, wherein the second stage identifier is associated with the partition identifier. For each mapping from partition identifiers to internal partition identifiers in the first stage partition identifier remapping circuitry, a second stage identifier can be provided that identifies which of the plurality of replacement internal partition identifiers is to be considered. As previously described, which of these replacement internal partition identifiers is used to override the internal partition identifier in the mapping is dependent on a match between the masked sideband signal and the match value associated with the comparison circuitry (e.g. stored by the comparison circuits that are selected at the second stage identifier).

In some examples, in response to the second stage identifier identifying multiple of the plurality of replacement internal partition identifiers to be considered and the sideband signal corresponding with the mask and match values, the second stage partition identifier remapping circuitry is configured to raise an error. In many examples, the second stage identifier is one-hot or one-cold, such that a single comparison circuit is identified. However, this is not a requirement, and it is possible for the second stage identifier to identify a plurality of comparison circuits. In this situation, when the sideband signal is such that matches occur in multiple comparison circuits, multiple replacement internal partition identifiers are provided. These examples respond to the situation by raising an error. For instance, this may cause a fault or exception to be raised, to be handled by the operating system or other management software. In addition to this, or as an alternative to this, in some examples, in response to the second stage identifier identifying multiple replacement internal partition identifiers and the mask and match values corresponding with the sideband signal, the second stage partition identifier remapping circuitry is configured to consider the replacement internal partition identifiers in a predefined order. These examples therefore rank the comparison circuits, and the replacement internal partition identifier that is provided by a highest ranked comparison circuit is the one that is used to override the internal partition identifier provided by the first stage partition identifier remapping circuitry.

There are a number of ways in which the sideband signal can be stored and provided. However, in some examples, the apparatus comprises: the memory transaction comprises a memory address to be accessed by the at least one memory system component; the apparatus comprises memory management circuitry configured to store one or more attributes in association with the memory address; and the one or more attributes comprise a value corresponding to the sideband signal. The memory management circuitry could, for instance, take the form of a translation look aside buffer (TLB), which stores translations between virtual addresses and physical addresses, e.g. in the form of page table entries. Within the memory management circuitry, one of more attributes can be stored in association with a particular memory address. These attributes could correspond with or be used to provide the sideband signal. Consequently, when a memory access is made to a particular memory address, e.g. as part of a memory transaction, the full memory address is looked up in the TLB and the attributes associated with that address are used as the sideband signal in order to control the partition identifier used within the memory transaction.

In some examples, the one or more attributes comprise page based hardware attributes that comprise the value corresponding to the sideband signal.

In some examples, the memory transaction comprises one or more memory operation attributes; and the one or more memory operation attributes comprise a value corresponding to the sideband signal.

In these examples, these memory operation attributes may control how the memory operation proceeds and are used to provide the sideband signal that is used to control the selection of partition identifier. The memory operation itself therefore can have an impact on the selection of (physical) partition identifier and consequently how the corresponding memory system component is to be used. For instance, in some examples, the one or more memory operation attributes indicate whether the memory transaction is a read operation or a write operation. In this way, it is possible to control caching based on whether the memory access that is taking place is a read memory access or a write memory access. This could be useful in a situation in which read misses are effected to be for data that is expected to be reused regularly, whereas the same may not be true of data that is written. In this situation, it may be desirable to allocate a much larger section of the cache for read transactions than to write transactions. This can be achieved by specifying, as the sideband signal, whether a read transaction or a write transaction is being performed and then causing a different internal partition identifier to be selected depending on whether a read or write operation is occurring. In particular, where a read operation is occurring, the internal partition identifier could refer to a configuration in which a much larger cache size is allocated.

In some examples, the memory management circuitry is a memory management unit comprising a plurality of page table entries; and the memory address is a virtual address. The memory management circuitry could take a number of forms. However, in some examples, the memory management circuitry is a memory management unit (MMU). Entries within an MMU could be page table entries, which control not only the translation between virtual and physical addresses but can also specify attributes such as permissions for accessing the memory pages.

In some examples, the resources comprise one or more portions of one or more caches. For instance, in some examples, a cache can be partitioned by providing a number of lines (or sets) to one partition and a number of lines or sets to another partition. In some other examples, a number of ways of a set-associative cache can be allocated to one partition and a number of ways of the same cache can be associated with another partition. The partitioning that takes place could be with one or several caches within the memory hierarchy of the apparatus. However, in some examples, the cache that is the memory system component is a last level cache (LLC), which is a last cache in the memory hierarchy prior to a main memory system (e.g. backed up by DRAM).

Particular embodiments will now be described with reference to the figures.

FIG. 1 schematically illustrates an example of a processing unit 6. The processor includes a processing pipeline including a number of pipeline stages, including a fetch stage 40 for fetching instructions from the instruction cache 10, a decode stage 42 for decoding the fetched instructions, an issue stage 44 comprising an issue queue 46 for queueing instructions while waiting for their operands to become available and issuing the instructions for execution when the operands are available, an execute stage 48 comprising a number of execute units 50 for executing different classes of instructions to perform corresponding processing operations, and a write back stage 52 for writing results of the processing operations to data registers 54. Source operands for the data processing operations may be read from the registers 54 by the execution stage 48. In this example, the execute stage 48 includes an ALU (arithmetic/logic unit) for performing arithmetic or logical operations, a floating point (FP) unit for performing operations using floating-point values and a load/store unit for performing load operations to load data from the memory system into registers 54 or store operations to store data from registers 54 to the memory system. It will be appreciated that these are just some examples of possible execution units and other types could be provided. Similarly, other examples may have different configurations of pipeline stages. For example, in an out-of-order processor, an additional register renaming stage may be provided for remapping architectural register specifiers specified by instructions to physical register speci- fiers identifying registers 54 provided in hardware, as well as a reorder buffer for tracking the execution and commit- ment of instructions executed in a different order to the order in which they were fetched from the cache 10. Similarly, other mechanisms not shown in FIG. 1 could still be provided, e.g. branch prediction functionality.

The processor 6 has a number of control registers 60, including for example a program counter register 62 for storing a program counter indicating a current point of execution of the program being executed, an exception level register 64 for storing an indication of a current exception level at which the processor is executing instructions, a security state register 66 for storing an indication of whether the processor is in a non-secure or a secure state, and memory partitioning and monitoring (MPAM) control reg- isters 68 for controlling memory system resource and per- formance monitoring partitioning (the MPAM control reg- isters are discussed in more detail below). It will be appreciated that other control registers could also be pro- vided.

The processor has a memory management unit (MMU) 70 for controlling access to the memory system in response to memory transactions. For example, when encountering a load or store instruction, the load/store unit issues a corre- sponding memory transaction specifying a virtual address. The virtual address is provided to the memory management unit (MMU) 70 which translates the virtual address into a physical address using address mapping data stored in a translation lookaside buffer (TLB) 72. Each TLB entry may identify not only the mapping data identifying how to translate the address, but also associated access permission data which defines whether the processor is allowed to read or write to addresses in the corresponding page of the address space. In some examples there may be multiple stages of address translation and so there may be multiple TLBs, for example a stage 1 TLB providing a first stage of translation for mapping the virtual address generated by the load/store unit 50 to an intermediate physical address, and a stage 2 TLB providing a second stage of translation for mapping the intermediate physical address to a physical address used by the memory system to identify the data to be accessed. The mapping data for the stage 1 TLB may be set under control of an operating system, while the mapping data for the stage 2 TLB may be set under control of a hypervisor, for example, to support virtualisation. While FIG. 1 for conciseness shows the MMU being accessed in response to data accesses being triggered by the load/store unit, the MMU may also be accessed when the fetch stage 40 requires fetching of an instruction which is not already stored in the instruction cache 10, or if the instruction cache 10 initiates an instruction prefetch operation to prefetch an instruction into the cache before it is actually required by the fetch stage 40. Hence, virtual addresses of instructions to be executed may similarly be translated into physical addresses using the MMU 70.

In addition to the TLB 72, the MMU may also comprise other types of cache, such as a page walk cache 74 for caching data used for identifying mapping data to be loaded into the TLB during a page table walk. The memory system may store page tables specifying address mapping data for each page of a virtual memory address space. The TLB 72 may cache a subset of those page table entries for a number of recently accessed pages. If the processor issues a memory transaction to a page which does not have corresponding address mapping data stored in the TLB 72, then a page table walk is initiated. This can be relatively slow because there may be multiple levels of page tables to traverse in memory to identify the address mapping entry for the required page. To speed up page table walks, recently accessed page table entries of the page table can be placed in the page walk cache 74. These would typically be page table entries other than the final level page table entry which actually specifies the mapping for the required page. These higher level page table entries would typically specify where other page table entries for corresponding ranges of addresses can be found in memory. By caching at least some levels of the page table traversed in a previous page table walk in the page walk cache 74, page table walks for other addresses sharing the same initial part of the page table walk can be made faster. Alternatively, rather than caching the page table entries themselves, the page walk cache 74 could cache the addresses at which those page table entries can be found in the memory, so that again a given page table entry can be accessed faster than if those addresses had to be identified by first accessing other page table entries in the memory.

Figures 2, 3:
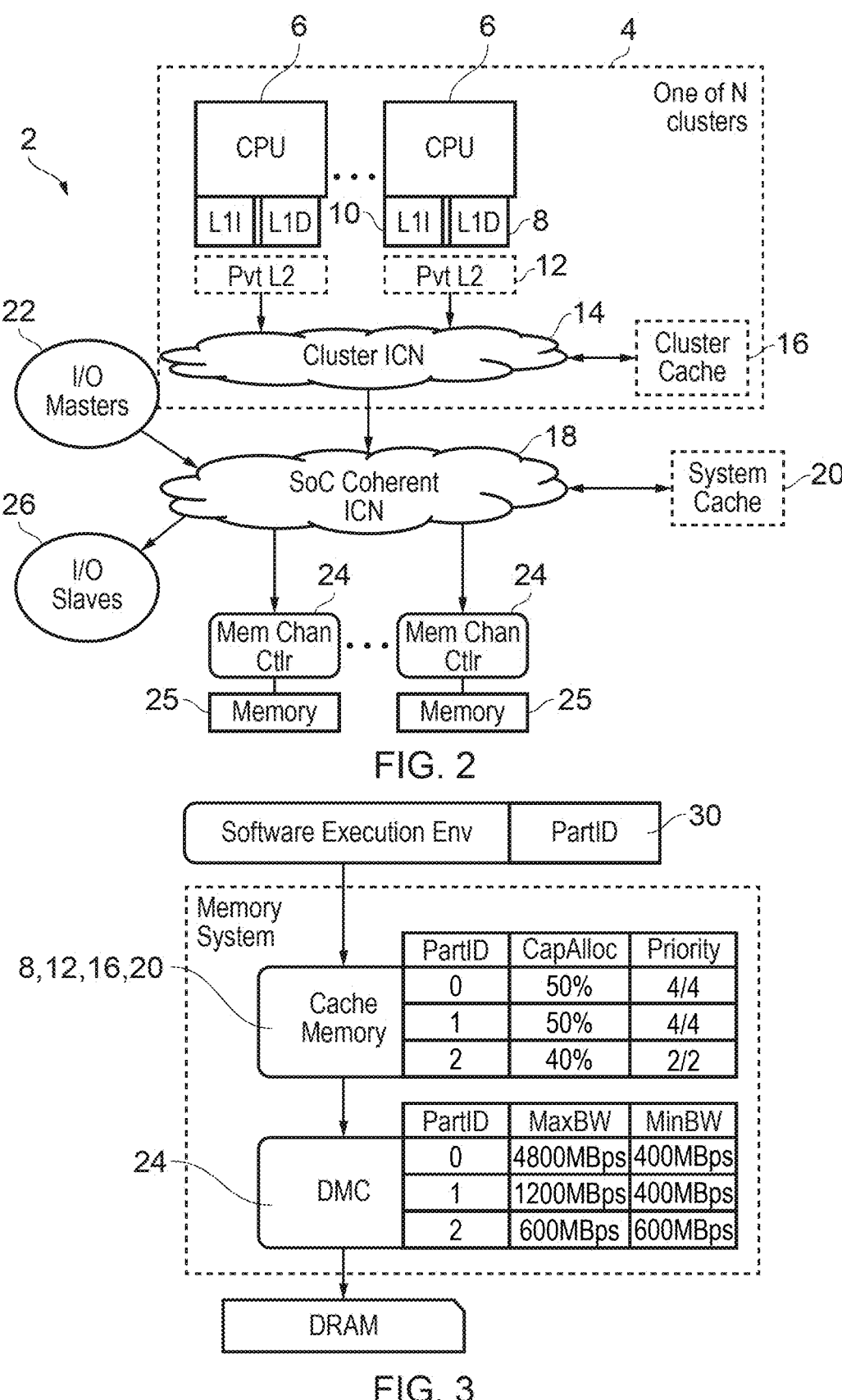
FIG. 2 schematically illustrates an example of a data processing system comprising N processing clusters.
FIG. 3 schematically illustrates an example of partitioning the control of allocation of memory system resources.

FIG. 2 schematically illustrates an example of a data processing system 2 comprising N processing clusters 4 (N is 1 or more), where each processing cluster includes one or more processing units 6 such as a CPU (central processing unit) or GPU (graphics processing unit). Each processing unit 6 may have at least one cache, e.g. a level 1 data cache 8, level 1 instruction cache 10 and shared level 2 cache 12. It will be appreciated that this is just one example of a possible cache hierarchy and other cache arrangements could be used. The processing units 6 within the same cluster are coupled by a cluster interconnect 14. The cluster inter- connect may have a cluster cache 16 for caching data accessible to any of the processing units.

A system on chip (SoC) interconnect 18 couples the N clusters and any other master devices 22 (such as display controllers or direct memory access (DMA) controllers). The SoC interconnect may have a system cache 20 for caching data accessible to any of the masters connected to it. The SoC interconnect 18 controls coherency between the respective caches 8, 10, 12, 16, 20 according to any known coherency protocol. The SoC interconnect is also coupled to one or more memory controllers 24, each for controlling access to a corresponding memory 25, such as DRAM or SRAM. The SoC interconnect 18 may also direct transac- tions to other slave devices 26, such as a crypto unit for providing encryption/decryption functionality.

Hence, the data processing system 2 comprises a memory system for storing data and providing access to the data in response to transactions issued by the processing units 6 and other master devices 22. The caches 8, 10, 12, 16, 20, the interconnects 14, 18, memory controllers 24 and memory devices 25 can each be regarded as a component of the memory system. Other examples of memory system com- ponents may include memory management units or translation lookaside buffers (either within the processing units 6 themselves or further down within the system interconnect 18 or another part of the memory system), which are used for translating memory addresses used to access memory, and so can also be regarded as part of the memory system. In general, a memory system component may comprise any component of a data processing system used for servicing memory transactions for accessing memory data or controlling the processing of those memory transactions.

The memory system may have various resources available for handling memory transactions. For example, the caches 8, 10, 12, 16, 20 have storage capacity available for caching data required by a given software execution environment executing on one of the processors 6, to provide quicker access to data or instructions than if they had to be fetched from main memory 25. Similarly, MMUs/TLBs may have capacity available for caching address translation data. Also, the interconnects 14, 18, the memory controller 24 and the memory devices 25 may each have a certain amount of bandwidth available for handling memory transactions.

When multiple software execution environments executing on the processing elements 6 share access to the memory system, it can be desirable to prevent one software execution environment or a specific hardware accelerator using more than its fair share of resource, to prevent other execution environments perceiving a loss of performance. This can be particularly important for data centre (server) applications where there is an increasing demand to reduce capital expenditure by increasing the number of independent software processes which interact with a given amount of memory capacity, to increase utilisation of the data centre servers. Nevertheless, there will still be a demand to meet web application tail latency objectives and so it is undesirable if one process running on the server can monopolise memory system resources to an extent that other processes suffer. Similarly, for networking applications, it is increasingly common to combine multiple functions onto a single SoC which previously would have been on separate SoCs. This again leads to a desire to limit performance interactions between software execution environments, and to monitor how those need to allow those independent processes to access the shared memory while limiting performance interactions. In addition, the present technique be beneficial for a client system where something like a GPU within a single application environment could overload the cache. In this kind of system, a single software execution environment may wish to use multiple physical partitions in the system cache in order to improve system cache usage.

FIG. 3 schematically illustrates an example of partitioning the control of allocation of memory system resources in dependence on the software execution environment which issues the corresponding memory transactions. In this context, a software execution environment may be any process, or part of a process, executed by a processing unit within a data processing system. For example, a software execution environment may comprise an application, a guest operating system or virtual machine, a host operating system or hypervisor, a security monitor program for managing different security states of the system, or a sub-portion of any of these types of processes (e.g. a single virtual machine may have different parts considered as separate software execution environments). As shown in FIG. 3, each software execution environment may be allocated a given partition identifier 30 which is passed to the memory system components along with memory transactions that are associated with that software execution environment. Here, the partition identifier is independent of the functional outcome of a memory access request itself. That is, considerations such as whether the memory access itself is permitted or rejected and which memory access system is accessed is independent of the partition identifier. A specific example of this might be that if the partition identifier is changed for a given software execution environment, this might change how quickly a memory access request from that software execution environment is performed. However, the change in partition identifier will not affect whether that memory access request will actually be performed. Nor does the partition identifier require a specific memory address or memory attribute.

Within the memory system component, resource allocation or contention resolution operations can be controlled based on one of a number of sets of memory system component parameters selected based on the partition identifier. For example, as shown in FIG. 3, each software execution environment may be assigned an allocation threshold representing a maximum amount of cache capacity that can be allocated for data/instructions associated with that software execution environment, with the relevant allocation threshold when servicing a given transaction being selected based on the partition identifier associated with the transaction. For example, in FIG. 3 transactions associated with partition identifier 0 may allocate data to up to 50% of the cache's storage capacity, leaving at least 50% of the cache available for other purposes.

Similarly, in a memory system component such as the memory controller 24 which has a finite amount of bandwidth available for servicing memory transactions, minimum and/or maximum bandwidth thresholds may be specified for each partition identifier. A memory transaction associated with a given partition identifier can be prioritised if, within a given period of time, memory transactions specifying that partition identifier have used less than the minimum amount of bandwidth, while a reduced priority can be used for a memory transaction if the maximum bandwidth has already been used or exceeded for transactions specifying the same partition identifier.

These control schemes will be discussed in more detail below. It will be appreciated that these are just two examples of ways in which control of memory system resources can be partitioned based on the software execution environment that issued the corresponding transactions. In general, by allowing different processes to "see" different partitioned portions of the resources provided by the memory system, this allows performance interactions between the processes to be limited to help address the problems discussed above.

Similarly, the partition identifier associated with memory transactions can be used to partition performance monitoring within the memory system, so that separate sets of performance monitoring data can be tracked for each partition identifier, to allow information specific to a given software execution environment (or group of software execution environments) to be identified so that the source of potential performance interactions can be identified more easily than if performance monitoring data was recorded across all software execution environments as a whole. This can also help diagnose potential performance interaction effects and help with identification of possible solutions.

An architecture is discussed below for controlling the setting of partition identifiers, labelling of memory transactions based on the partition identifier set for a corresponding software execution environment, routing the partition identifiers through the memory system, and providing partition-based controls at a memory system component in the memory system. This architecture is scalable to a wide range of uses for the partition identifiers. The use of the partition identifiers is intended to layer over the existing architectural semantics of the memory system without changing them, and so addressing, coherence and any required ordering of memory transactions imposed by the particular memory protocol being used by the memory system would not be affected by the resource/performance monitoring partitioning. When controlling resource allocation using the partition identifiers, while this may affect the performance achieved when servicing memory transactions for a given software execution environment, it does not affect the result of an architecturally valid computation. That is, the partition identifier does not change the outcome or result of the memory transaction (e.g. what data is accessed), but merely affects the timing or performance achieved for that memory transaction.

Figure 4:
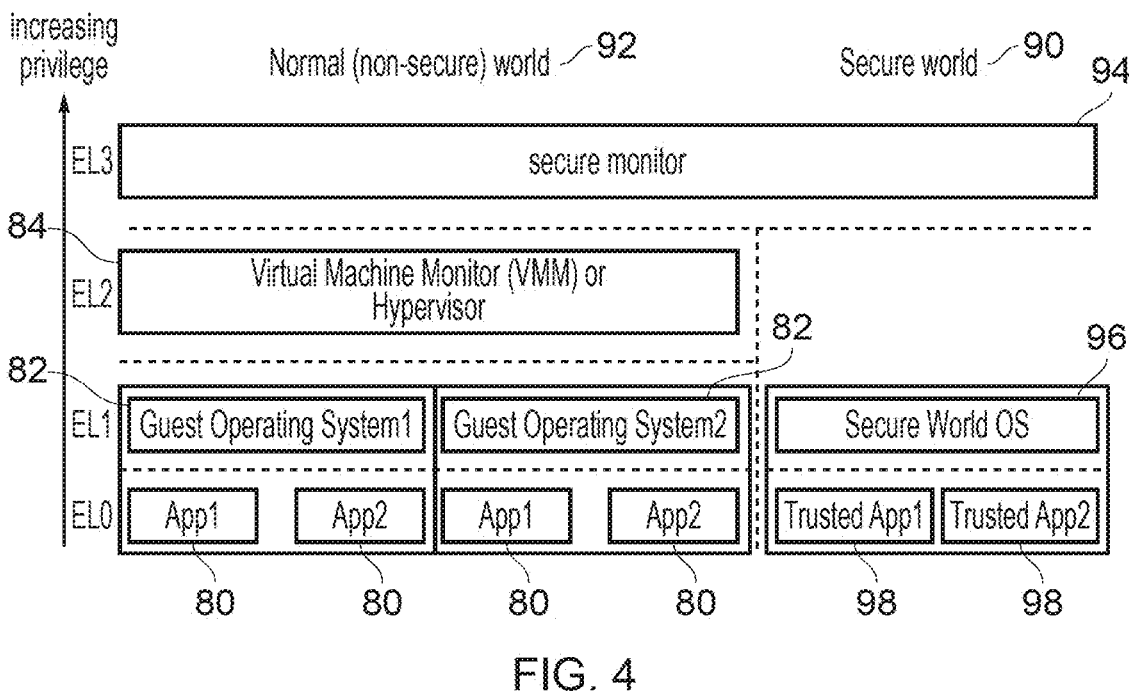
FIG. 4 shows an example of different software execution environments which may be executed by the processor.

FIG. 4 shows an example of different software execution environments which may be executed by the processor 6. In this example the architecture supports four different exception levels EL0 to EL3 increasing in privilege level (so that EL3 has the highest privilege exception level and EL0 has the lowest privilege exception level). In general, a higher privilege level has greater privilege than a lower privilege level and so can access at least some data and/or carry out some processing operations which are not available to a lower privilege level. Applications 80 are executed at the lowest privilege level EL0. A number of guest operating systems 82 are executed at privilege level EL1 with each guest operating system 82 managing one or more of the applications 80 at EL0. A virtual machine monitor, also known as a hypervisor or a host operating system, 84 is executed at exception level EL2 and manages the virtualisation of the respective guest operating systems 82. Transitions from a lower exception level to a higher exception level may be caused by exception events (e.g. events required to be handled by the hypervisor may cause a transition to EL2), while transitions back to a lower level may be caused by return from handling an exception event. Some types of exception events may be serviced at the same exception level as the level they are taken from, while others may trigger a transition to a higher exception state. The current exception level register 64 indicates which of the exception levels EL0 to EL3 the processing circuitry 6 is currently executing code in.

In this example the system also supports partitioning between a secure domain 90 and a normal (less secure) domain 92. Sensitive data or instructions can be protected by allocating them to memory addresses marked as accessible to the secure domain 90 only, with the processor having hardware mechanisms for ensuring that processes executing in the less secure domain 92 cannot access the data or instructions. For example, the access permissions set in the MMU 70 may control the partitioning between the secure and non-secure domains, or alternatively a completely separate security memory management unit may be used to control the security state partitioning, with separate secure and non-secure MMUs 70 being provided for sub-control within the respective security states. Transitions between the secure and normal domains 90, 92 may be managed by a secure monitor process 94 executing at the highest privilege level EL3. This allows transitions between domains to be tightly controlled to prevent non-secure operations 80 or operating systems (or management systems) 82 for example accessing data from the secure domain. In other examples, hardware techniques may be used to enforce separation between the security states and police transitions, so that it is possible for code in the normal domain 92 to branch directly to code in the secure domain 90 without transitioning via a separate secure monitor process 94. However, for ease of explanation, the subsequent description below will refer to an example which does use the secure monitor process 94 at EL3. Within the secure domain 90, a secure world operating system 96 executes at exception level EL1 and one or more trusted applications 98 may execute under control of that operating system 96 at exception level EL0. In this example there is no exception level EL2 in the secure domain 90 because virtualisation is not supported in the secure domain, although it would still be possible to provide this if desired. An example of an architecture for supporting such a secure domain 90 may be the Trustzone architecture provided by ARM® Limited of Cambridge, UK. Nevertheless it will be appreciated that other techniques could also be used. Some examples could have more than two security states, providing three or more states with different levels of security associated with them. The security state register 66 indicates whether the current domain is the secure domain 90 or the non-secure 92 and this indicates to the MMU 70 or other control units what access permissions to use to govern whether certain data can be accessed or operations are allowed.

Figure 5:
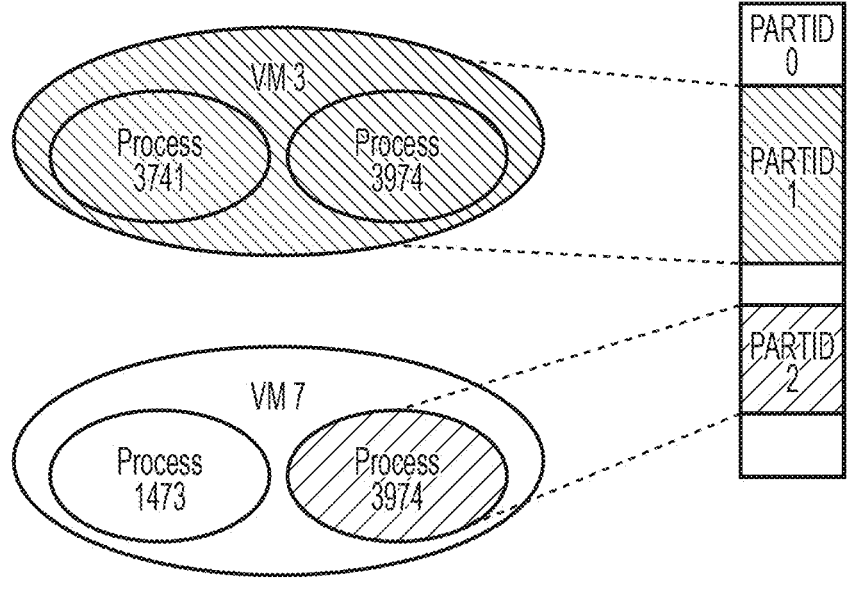
FIG. 5 shows an example of virtual machines and applications.

Hence, FIG. 4 shows a number of different software execution environments 80, 82, 84, 94, 96, 98 which can be executed on the system. Each of these software execution environments can be allocated a given partition identifier (partition ID or PARTID), or a group of two or more software execution environments may be allocated a common partition ID. In some cases, individual parts of a single processes (e.g. different functions or sub-routines) can be regarded as separate execution environments and allocated separate partition IDs. For example, FIG. 5 shows an example where virtual machine VM 3 and the two applications 3741, 3974 executing under it are all allocated PARTID 1, a particular process 3974 executing under a second virtual machine, VM 7, is allocated PARTID 2, and the VM7 itself and another process 1473 running under it is allocated PARTID 0. It is not necessary to allocate a bespoke partition ID to every software execution environment. A default partition ID may be specified to be used for software execution environments for which no dedicate partition ID has been allocated. The control of which parts of the partition ID space are allocated to each software execution environment is carried out by software at a higher privilege level, for example a hypervisor running at EL2 controls the allocation of partitions to virtual machine operating systems running at EL1. However, in some cases the hypervisor may permit an operating system at a lower privilege level to set its own partition IDs for parts of its own code or for the applications running under it. Also, in some examples the secure world 90 may have a completely separate partition ID space from the normal world 92, controlled by the secure world OS or monitor program EL3.

Figure 6A:
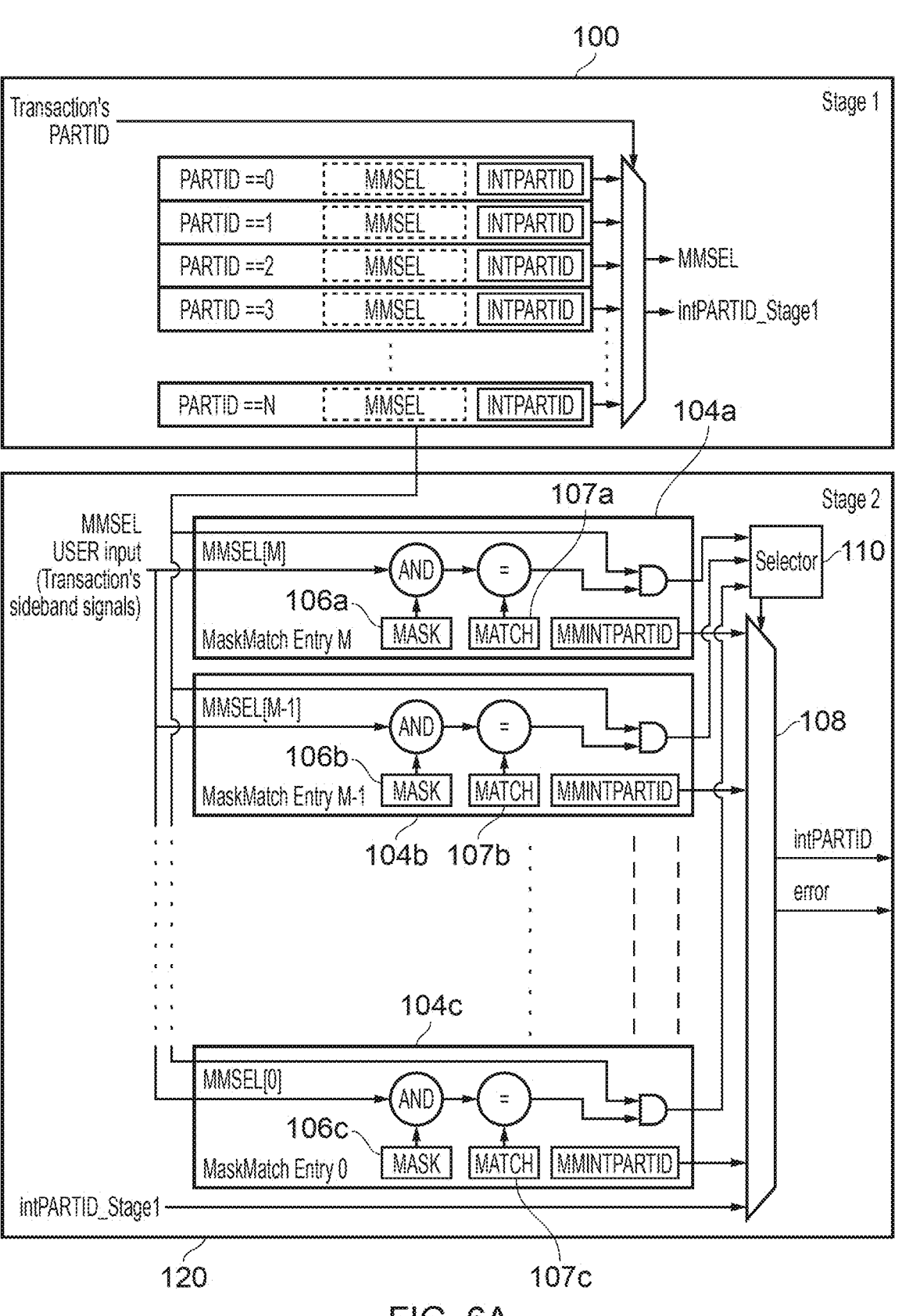
FIG. 6A shows an example of first stage partition identifier remapping circuitry and second stage partition identifier remapping circuitry.

FIG. 6A shows an example of first stage partition identifier remapping circuitry 100 and second stage partition identifier remapping circuitry 102 that are used to convert a partition identifier (PARTID) provided by a software execution environment such as an application or operating system to a internal partition identifier (INTPARTID) as used by the memory system component. This virtualisation makes it possible to enable a larger number (e.g. 256) of different partitions even though the memory system components need only be capable of supporting a smaller number (e.g. 8) of partitions at any one time.

The first stage partition identifier remapping circuitry 100 provides an initial mapping between the PARTID and the INTPARTID. In addition, a second stage identifier MMSEL is provided for each mapping/entry in the circuitry 100. The MMSEL indicates the extent to which the second stage partition identifier remapping circuitry 102 should be used.

The second stage partition identifier remapping circuitry 102 provides a second mapping between the PARTID and the INTPARTID. The second stage partition identifier remapping circuitry 102 includes a number of comparison circuits 104a, 104b, 104c. Each comparison circuit 104a, 104b, 104c stores a corresponding mask 106a, 106b, 106c, which is used to select (unmask) which incoming sideband signals to use for matching. Each comparison circuit 104a, 104b, 104c also stores a match value 107a, 107b, 107c, which is compared against the masked incoming sideband signal. This comparison can be performed by performing a logical AND between the sideband signal and the mask, and then comparing whether the resultant bits are equal to the match value. If a particular comparison circuit 106b is both selected by the MMSEL value and if a match on the sideband signal is produced, then a positive (e.g. via a binary '1') selection signal is output to a selector circuit 110. The selector circuit 110 is used to provide a control signal to a multiplexer 108, which receives replacement INTPARTIDs (stored as MMINTPARTID) from each comparison circuit 106a, 106b, 106c. In this way, where a match on the sideband signal and a match on the MMSEL value occurs, the corresponding replacement internal partition identifier can be selected to override the INTPARTID value selected by the first stage partition identifier remapping circuitry 102.

There are a number of ways in which the MMSEL value can be used to select which of the comparison circuits 104a, 104b, 104c should be considered. In some examples, the MMSEL value can be a mask to indicate, using a binary representation of '1' for yes and '0' for no, which comparison circuits 104a, 104b, 104c to activate. For instance, the value could be '110', meaning that the first comparison circuit 104a and the second comparison circuit 104b should be considered. As another example, the value could be '011' meaning that the second comparison circuit 104b and the third comparison circuit 104c should be considered. In some examples, the MMSEL value is one-hot meaning that only a single '1' is contained within the MMSEL mask. In some examples, the meaning of the '0' and '1' within MMSEL can be inverted and in some of these examples, the MMSEL value could be one-cold meaning that only a single '0' is contained within the MMSEL mask.

Since the MMSEL value need not be one-hot (or one-cold), multiple comparison circuits 104a, 104b, 104c might be considered simultaneously. The situation could therefore arise in which multiple comparison circuits 104a, 104b, 104c are considered and several of them match on the sideband signal. In these examples, the multiplexer 108 is configured to output an error signal to indicate that multiple matches occurred. This can be represented as a fault or exception that is handled at a higher exception level (e.g. EL1 for an application or EL2 for an operating system).

Figure 6B:
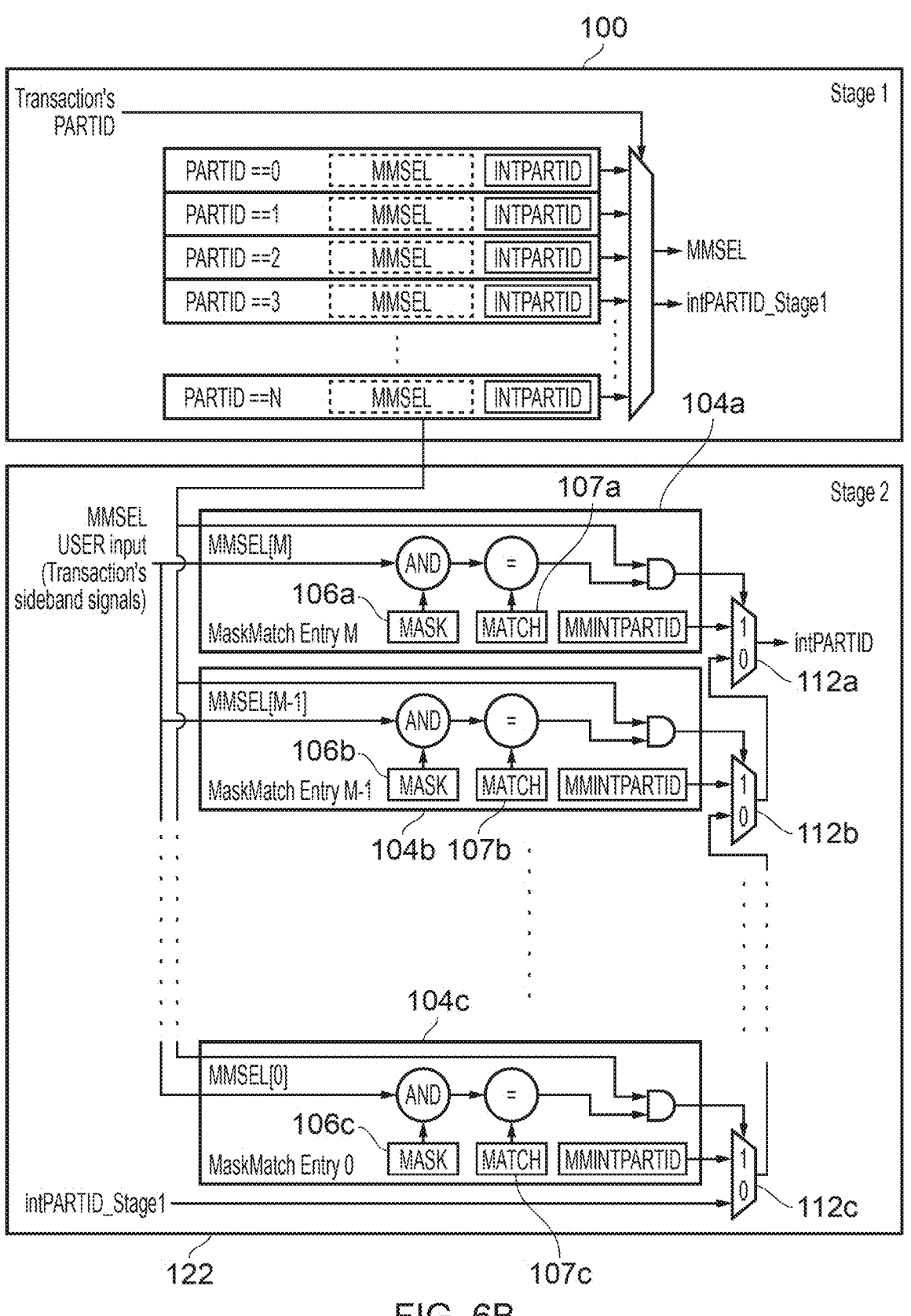
FIG. 6B shows an example of first stage partition identifier remapping circuitry and second stage partition identifier remapping circuitry.

FIG. 6B illustrates a variant in which a priority system is implemented so that if multiple replacement internal partition identifiers are provided by the comparison circuits 104a, 104b, 104c then the second stage partition identifier remapping circuitry 122 provides the internal partition identifier from a comparison circuit 104a having a highest priority. For instance, if two comparison circuits 104b, 104c both provide a match against the sideband signal and if those comparison circuits 104b, 104c are both selected by MMSEL, the comparison circuit 104b having a higher priority than the other 104c is used to provide the replacement internal partition identifier. In the example of FIG. 6B, this is achieved by a chained set of multiplexers 112a, 112b, 112c, with each multiplexer 112a, 112b other than the first taking the previous multiplexer's output as an input, together with an output from the corresponding comparison circuit. The first multiplexer 112c takes inputs from the associated comparison circuit 104c and the default output from the first stage partition identifier remapping circuitry 100. The result of the first multiplexer 112a is the overall result of the internal partition identifier to be used.

In both of the above systems, once, for a specific incoming PARTID, MMSEL and the corresponding second stage comparison mask and match values are setup to match against a sideband signal, different intPARTID can be selected from the first stage INTPARTID or second stage MMINTPARTID and depending on the match results against the access sideband signals. Such modification can be made without a call being made to any management software (e.g. the operating system in the case of an application or the hypervisor in the case of an operating system). Consequently, the internal partition identifier being used can be easily and quickly changed without the management software being accessed to change the original partition identifier and without the internal partition identifier in the first stage partition identifier remapping circuitry 100 being modified.

Figure 7:
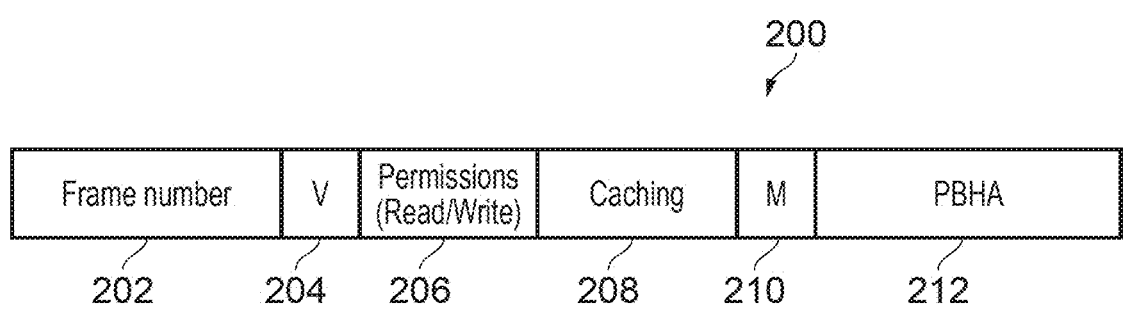
FIG. 7 shows an example of a page table entry.

There are a number of ways in which the sideband signal can be provided. FIG. 7 shows an example of a page table entry 200 as might be stored in, for instance, a TLB 72. The page table entry 200 includes a frame number 202, which is a frame associated with a physical address, a validity flag (V) 204, a set of permissions 206, caching configuration/ attributes 208, a modified/dirty flag 210, and Page Table Hardware Attribute (PBHA) flags 212. When a virtual address is to be translated to a physical address in order to access the memory location indicated by the virtual address in a memory transaction, the relevant page table entry is looked up in the TLB 72. The selected entry gives the frame number 202, which provides a block of physical addresses. The full physical address is determined by taking the least significant bits of the virtual address and appending these to the frame number 202. In this example, several of the parameters 208, 210, 212 could be used for providing the sideband signal—notably the caching attributes 208 and the PBHA 212.

The PBHA 212 can be used to provide one or more bits (e.g. two bits) when a successful lookup occurs in, for instance, the TLB 72. Such bits can therefore be used to provide a sideband signal, which can be used to indicate the partition identifier to be used when accessing a particular page or frame. In this way, a software execution environment can switch between partitions, again without involvement of any management software based on which area of memory is being accessed. That is, if one area of memory is accessed by the software execution environment then one internal partition identifier is used and if another area of memory is access by the same software execution environment then another internal partition identifier is used.

An alternative to using the permissions or attributes of a page table entry as all or part of the sideband signal is to consider an attribute associated with or a type of memory operation being performed in, for instance, the memory transaction issued from the software execution environment. For instance, the sideband signal could be derived based on whether the memory operation is a read operation or a write operation. By using operation information as the sideband signal it is possible to change memory system component configuration based on the type of memory operation that is taking place. This could, for example, be used to use memory system components differently based on whether a read operation or a write operation was taking place and such a differentiation could be useful where it is desirable to, for instance, provide increased caching to read operations as compared to write operations (or vice-versa).

FIG. 8 shows a worked example for two processes 2121 and 16 for a particular configuration of the first stage partition identifier remapping circuitry 100 and the second stage partition identifier remapping circuitry 122.

In the first example, the process 2121 issues a memory transaction specifying a (virtual) partition ID of 1. According to the first stage partition identifier remapping circuitry 100, this gives an MMSEL value of 00110 and an initial INTPARTID value of 1. The sideband signal value in this example is 10101, which is made up of PBHA[3:0] 212 followed by a one-bit read/write attribute (0 for read and 1 for write) indicating whether the transaction is a read transaction or write transaction. The MMSEL value indicates the comparison circuits that should be considered, with the rightmost bit referring to comparison circuit 0, the next left bit referring to comparison circuit 1, and so on. The value of 00110 indicates that comparison circuit 1 and comparison circuit 2 should be considered. These comparison circuits each have a mask of 10011. The logical AND of the sideband signal and the mask (10101 & 10011) gives a value of 10001 for matching. In the case of comparison circuit 2, the stored match value is 10000. Since 10001 and 10000 are different, no hit occurs. In the case of comparison circuit 1, the stored match value is 10001. Here, there is a hit. Since only one MMINTPARTID value is output by the comparison circuits there is no error and this MMINTPARTID value (3) replaces the initial INTPARTID value (1). It will be appreciated that comparison circuits 1 and 2 have the same mask, meaning that the same bits are examined. In particular, two bits of the PBHA are considered. In addition, the read/write attribute bit is considered but each of the comparison circuits has a different match value for the read/write bit. Consequently, each comparison circuit gives a different MMINTPARTID depending on whether the read/write attribute is read or write e.g. to allow a greater share of the cache to be used for one direction of data transfer more than another. Furthermore, this swapping of the memory system component (e.g. cache) configuration occurs without intervention of the management software. The swap occurs merely as a result of the type of transaction (read/write) changing.

In the second example, the process 16 issues a memory transaction specifying a partition ID of 2. According to the first stage partition identifier remapping circuitry 100, this gives an MMSEL value of 01000 and an initial INTPARTID value of 1. In this example, the sideband signal is 10100 (again made up of four bits from the PBHA and one read/write bit attribute). The MMSEL value indicates that the comparison circuit 3 should be considered. This has a mask of 10000 meaning that only the first bit of the sideband signal is used. In this case, then, the bit to be matched is 10000 & 10100=10000. This is different to the stored match value (00000) and so the corresponding MMINTPARTID value (7) is not output. Consequently, the default INTPARTID of 1 is kept.

Figure 9:
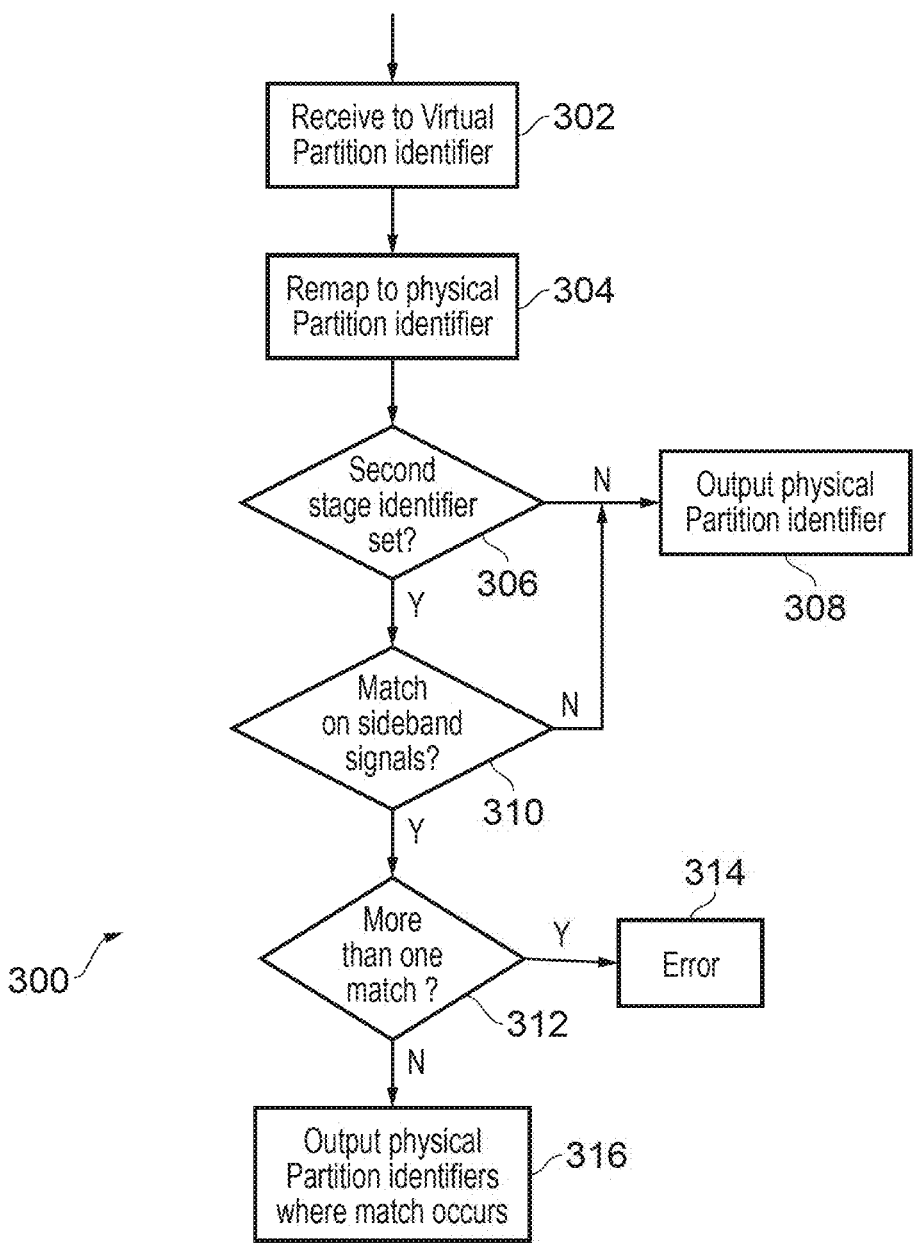
FIG. 9 illustrates a flowchart that shows a process for determining the internal partition identifier.

FIG. 9 illustrates a flowchart 300 that shows a process for determining the internal partition identifier. At a step 302, a partition identifier is received (e.g. at the first stage partition identifier remapping circuitry 100). At a step 304, an initial stage one mapping to an internal partition identifier is performed. Then, at a step 306, it is determined whether the second stage identifier is set to indicate that one or more comparison circuits 104 in the second stage partition identifier remapping circuitry 122 should be used. If no such indication is made, then the internal partition identifier already provided by the first stage partition identifier remapping circuitry 100 is provided as the internal partition identifier. Otherwise, at step 310 it is determined whether there is a match between the masked sideband signal and the match value provided in each comparison circuit indicated by the second stage identifier (e.g. MMSEL). If no match exists, then at step 308, the internal partition identifier provided in the first stage partition identifier remapping circuitry 100 is provided. Otherwise, at step 312, it is determined whether more than one match exists. If so, then at step 314 an error is produced. This could be the throwing of an exception or fault, for instance. Otherwise, at step 316, the physical identifier (MMINTPARTID) indicated by the matching comparison circuit is output, thereby overriding the identifier produced by the first stage partition identifier remapping circuitry 100.

It can therefore be seen how a single software execution environment (e.g. an application, process, or the like) can change the memory system component configuration being used dynamically. This can be achieved from an application without system calls to without intervention from management software allowing a software execution environment to change how memory system components are used based on the software execution environment's current operation.

Figure 10:
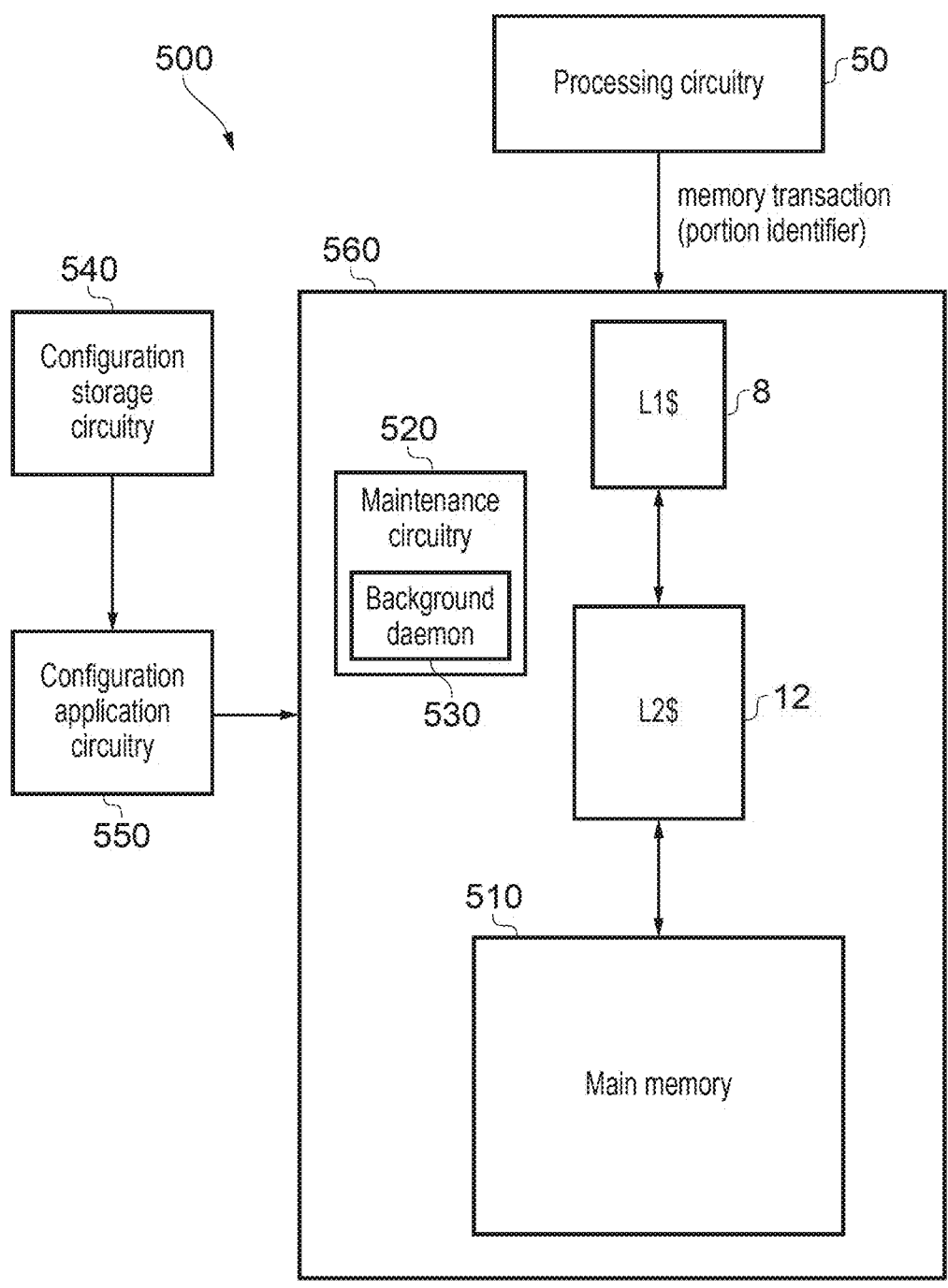
FIG. 10 illustrates an apparatus in accordance with some embodiments.

FIG. 10 illustrates an apparatus 500 in accordance with some embodiments. Processing circuitry 50, which might take the form of the previously described load/store execution unit 50 issues memory transactions to a memory system 560. In this example, the memory system is made up from a level one cache 8, a level two cache 12, and a main memory (e.g. backed by DRAM) 510. Other configurations of memory system are, of course, possible. Associated with the transaction (e.g. included within the transaction) is a partition identifier. The partition identifier is freely changeable—e.g. depending on which software execution environment has caused the memory transaction to be issued and/or depending on a specific partition identifier specified by the software execution environment. The partition identifier maps, within configuration storage circuitry 540, to a specific set of configuration parameters for operation of the memory system 560. These configuration parameters are applied to the memory system 560 using configuration application circuitry 550. In these examples, the configuration storage circuitry 540 and the configuration application circuitry 550 are shown externally to the memory system 560. However, these could also be part of the memory system 560 or could even be part of the processing circuitry 50. The memory system 560 includes maintenance circuitry 520, which performs maintenance operations on the memory system 560. A background daemon 530 can be provided to perform low-priority maintenance operations on the memory system 560, which are operations that must be performed at some point, but are not critical to be performed immediately. Other higher priority maintenance operations can be performed (e.g. immediately) with the maintenance circuitry 520.

FIG. 11 shows an example of configuration parameters that can be applied to partitions in the memory system. An IntPartID is an identifier used to refer to a particular (internal) partition. CMAX is a maximum capacity setting that indicates a maximum target amount of a part of the memory system (such as a cache) that the partition is permitted to use. CPBM is a capacity portion mapping bitmap, which can be used to indicate which part of the cache can be occupied. For instance, if a cache is divided into 4 ways, CPBM can be a 4 bit pattern "0011" with each bit indicating of each of the way (set to '1') that can be occupied by the partition. EN is an enable bit, which indicates whether the particular entry for the partition is enabled or disabled. Where an entry is disabled, its settings remain in the configuration storage circuitry 540. However, the settings are not actively applied for the partition. That is, any resources allocated to the disabled partition can be reallocated (either as required or proactively) and further resources are not allocated to the disabled partition. By disabling a partition in this way, it is possible to keep the settings for the partition, thus removing the need to reapply the settings if the partition is made use of again. In some examples, all of the enable bits for all partition identifiers are stored in a single register. In this way, multiple partitions can be enabled or disabled in a small number of operations (even a single operation). CMAXASC is the maximum associativity that is allowed for the partition to occupy in any cache set. CMIN is the minimum capacity setting that indicates a minimum target amount of a part of the memory system (e.g. the cache) that the partition is allocated. In general, the configuration application circuitry 550 will endeavour to allocate at least this amount of the resource (e.g. the cache capacity) to the partition. Where not every CMIN requirement can be met for every partition, some of the CMIN targets might not be met. HL indicates whether CMAX is a hard limit, that will not be exceeded. If CMAX is not a hard limit then it may, in contrast, be exceeded. Finally, the CTL provides specific cache behaviour controls such as prefetch control, write gathering control, line allocation control, DRAM speculation control and background operation control. These controls relate to other specific controls that dictate how the memory system 560 behaves for a particular partition. For instance, one of these controls might disable prefetching for a particular partition. Although not illustrated in the example of FIG. 11, it will be appreciated that the entries relating to resource allocation (CMAX, CMAXASC, CMIN, CBPM for instance) could be provided for each element 8, 12, 510 of the memory system 560 or could be provided for the memory system 560 as a whole.

Each of the entries relating to resource allocation (CMAX, CMAXASC, CMIN for instance) can be expressed in a number of different ways. In the example of FIG. 11, they are expressed as percentages (e.g. ratios). This could be of a number of ways, a total number of cache lines, and so on. CPBM is a prescriptive mapping of which portion of the cache the partition is allowed to occupy, and each portion could be a particular way or a particular portion of cache line, and again that is implementation defined. Here, the CPBM is a 16 bit value and could be used to represent the 16 ways of a cache for instance. In these examples, a single form of a measurement is provided. However, in some examples, depending on the implementation, multiple forms of measurement could be used simultaneously.

By providing a minimum resource target, it is possible to prevent or inhibit cache thrashing, which occurs when one partition repeatedly has its cache entries overwritten by another partition. By setting a minimum (via CMIN) at least some entries for the partition will be maintained where possible. This avoids a situation in which changes between software execution environments are repeatedly delayed by refilling the cache with urgent data. The predictability of access latency is also improved, since with the benefits of prefetching, it becomes more likely that required data will be found in the cache when a particular software execution environment resumes operation as compared to a situation where the environment must first wait to be loaded from the memory system (which could take a variable amount of time depending on where the data is located in the memory system).

FIG. 11 also demonstrates the enable bits, which can be used to disable or enable a particular partition. When a partition is disabled, its settings can remain in the configuration storage circuitry and thus do not need to be re-provided when the partition is re-enabled. However, resources that were allocated for a partition that becomes disabled can be reallocated to other partitions (in effect, the values of CMIN and CMAX are treated at 0). In this example, partition 1 is disabled (EN=0). Consequently, even though a CMIN of 1 way is set, if another partition requests the use of a new way (or of further storage space in the cache) then the 1 way previously allocated to partition 1 is instead given to the requesting partition. The same is true of partition N, which is also marked as disabled.

By marking an entire partition as inactive (e.g. disabled), it is possible to reallocate the resources claimed by that partition. In particular, rather than waiting for cache entries belonging to the partition to become old enough that they are replaced, the claimed resources can simply be reused. This could even be done proactively using a background daemon 530 to allow any dirty cache line data to be written back to DRAM ahead of time to reduce the cache writeback overheads later when the those cache line where selected for replacements (e.g. as might be provided for by maintenance circuitry 520) and directly reallocating the resources to other partitions.

FIG. 12 presents an allocation decision table, that indicates how particular resources are allocated when a partition attempts to store data in the memory system 560 (e.g. in a cache). The table illustrates the effect of CMIN, CMAX, HL, CMAXASC, and the enable bits EN. However, it will be appreciated that one or more of these parameters could not be implemented, in which case the relevant columns of the table are simply disregarded. The table indicates the behaviour to be taken depending on the above settings of both the active (requesting) partition and other partitions. A value of 'X' in the table means that the value is unimportant (e.g. regardless of the setting, the row can still apply).

A first example considers a row 'A'. This row states that if the requesting partition that wishes to store a new line has not used its CMIN allocation of the resource, and if the way(s) used by the partition have unallocated entries (or entries used by a partition marked as disabled), and if CMAXASC has not been reached, then one of the empty ways (or ways used by a disabled partition) are used to store the new line. Thus, in this example, if a partition has not used its minimum allocation and if there are resources that are unused (or only used by disabled partitions) then those unused lines (or lines claimed by disabled partitions) are used to store the data.

A second example considers a row 'B'. This row states that if the requesting partition that wishes to store a new line has used its CMIN allocation of the resource, and has also used its CMAX allocation of the resource, but CMAX is not a hard limit (HL), and if there is no free space (or space used by disabled partitions) and if, across all ways of the set in which the new data item is to be stored, each of the partitions storing data in those ways are using less than their CMIN allocation, then the partition can only replace its own lines. If no such line exist (or if no such line can be replaced), then the data is accessed in other ways, for example, by bypassing the cache to read or write directly to main memory without allocating to the cache. Therefore, in this example, if a partition is already using over its minimum and maximum target allocations (but is CMAX is not a hard limit) and if other partitions that might provide storage space have not yet even reached their minimum target allocations, then the partition is limited to only being able to replace its own line. The partition has already exceeded its maximum allocation and other partitions have not even reached their minimum, so further space is not provided.

It will be appreciated that as the requesting partition has more space assigned to it (as represented by moving downwards through the first three columns of the table), the resource allocation for the requesting partition becomes more restrictive. Similarly, as the other partitions that use ways of the set in which the data item might be stored (as represented by columns 6-8 in the table of FIG. 12) decrease their resource usage (initially using more than CMAX, then between CMIN and CMAX, and then less than CMIN), the behaviour also becomes more restrictive so that resources are given to the requesting partition less willingly.

A number of different behaviours are described. "Allocate to empty way or ways with disabled IntPARTID" means that the data item is stored to a way where the way is either unallocated or the way is currently in use by a partition whose enable bits indicate that it is currently disabled. "Replace way within>CMAX group" means that the data item to be stored is stored in one of the ways where the currently assigned partition has already exceeded its CMAX allocation. "Replace way within any>CMIN &≤CMAX group" means that the data item to be stored is stored in one of the ways where the currently assigned partition has already exceeded its CMIN allocation, but not its CMAX allocation. "Replace any way" means that any way where the data item could be stored is replaced. "Replace owned line only" means that only the requesting partitions own existing data lines can be replaced-that is, the resources used by the requesting partition are not increased. "Replace owned line only, else bypass" means that if the partition has data lines that it owns in any ways of the current target cache set, then its own lines is replaced. Otherwise the new request line is not allocated (stored in the cache) and the access bypasses the cache.

Figure 13:
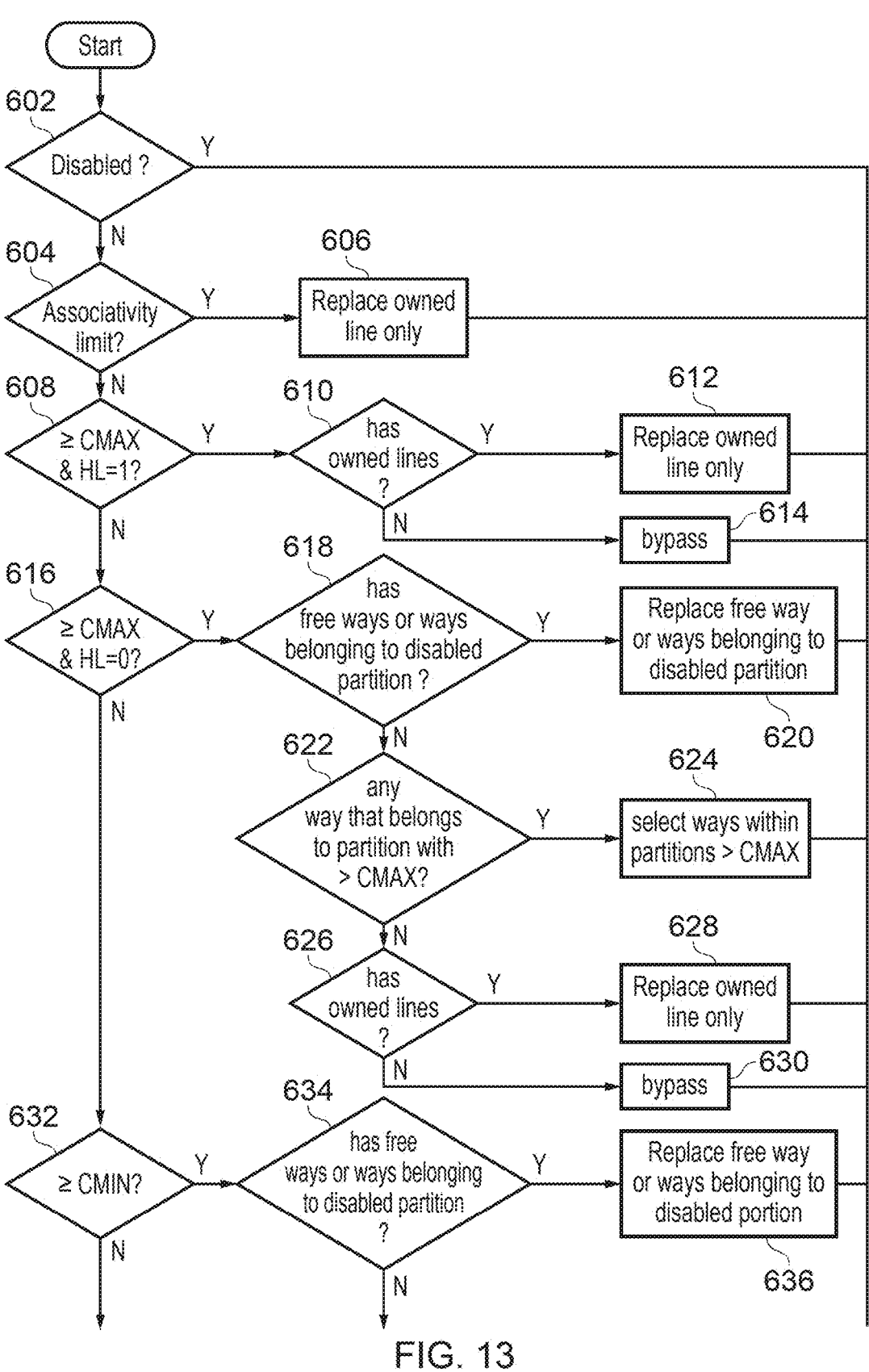
FIG. 13 illustrates the table of FIG. 12 in the form of a flowchart 600 that expresses the overall goals of an example system.
Figure 13:
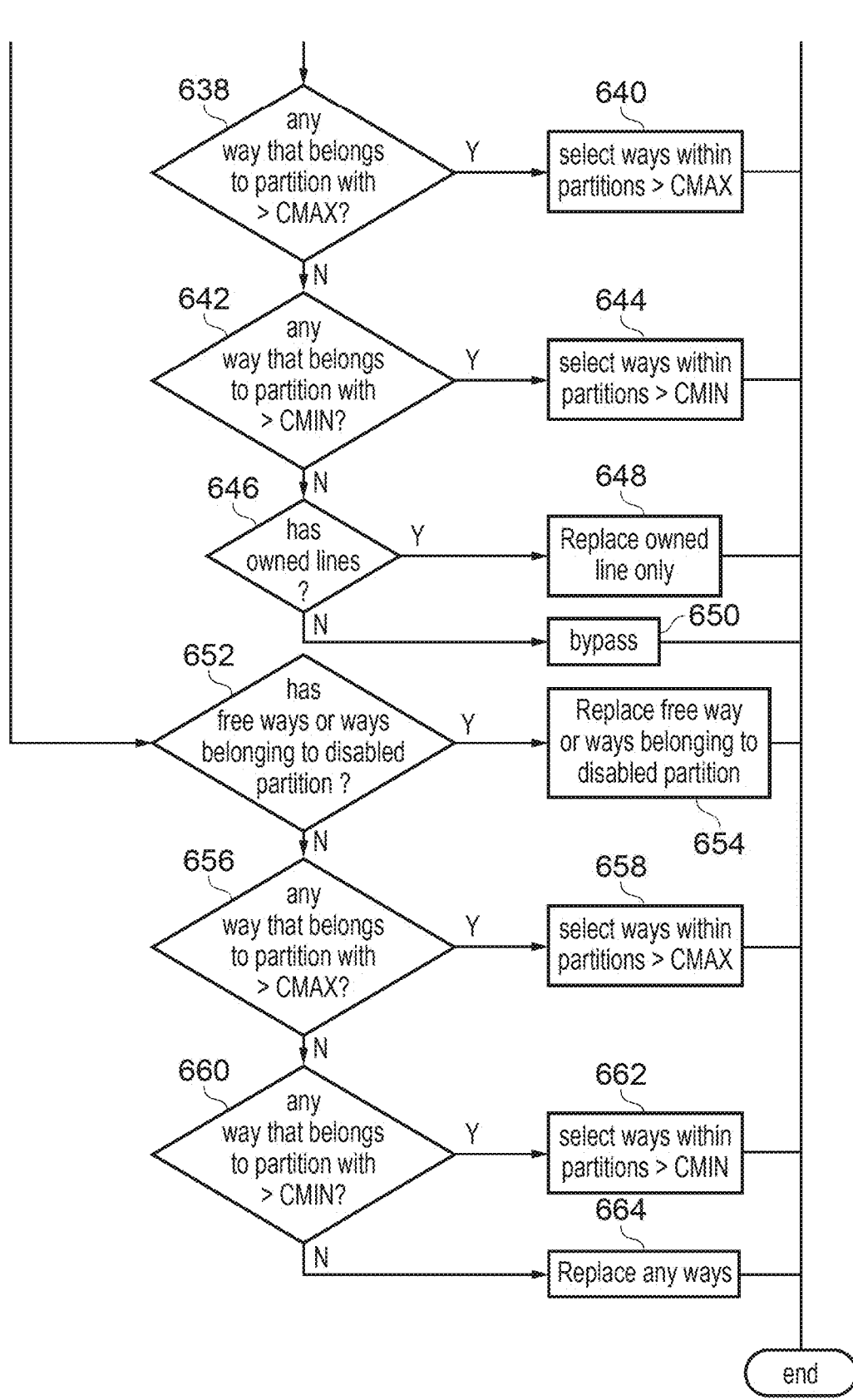

FIG. 13 illustrates the table of FIG. 12 in the form of a flowchart 600 that expresses the overall goals of an example system. In practice, of course, the applied behaviour is expressed in a lookup table such as that shown in FIG. 11. The flowchart 600 therefore represents the overall priorities that are ultimately achieved. For every access, a cache look up is performed to check and access (read or write) any line already in the cache (cache hit), and this process described in the flowchart 600 is taken when a cache miss occurs. If after the process, a line is selected for replacement, the selected line is replaced by a target line from main memory and used for the access. If no line is selected or a bypass occurs, then the miss access bypasses the cache and directly accesses the main memory.

At a step 602, it is determined whether the partition is disabled. If so, then the process ends. In other words, if a partition is marked as disabled then, in this example, a memory transaction that specifies that partition cannot cause the data that is the subject of the memory transaction to be stored in the cache. If the partition is not disabled, then at step 604, it is determined whether the associativity limit has been reached. If so, then at step 606, the executed behaviour is that only lines owned by that partition can be replaced. Otherwise, at step 608, it is determined whether the hard limit has been reached for the requesting partition (e.g. that the CMAX has been exceeded and CMAX is listed as being a hard limit). If so, then at step 610, it is determined whether any lines are owned by the requesting partition. If so, then at step 612, those owned lines can be replaced. Otherwise at step 614, the previously described bypassing behaviour is performed. If a non-hard maximum limit is exceeded (e.g. CMAX is exceeded, but CMAX is not listed as being a hard limit) then at step 618 it is determined whether there are free lines or ways belonging to any disabled partitions. If so, then at step 620, a replacement is selected from those ways or lines. Otherwise, at step 622 it is determined whether there are any ways that belong to partitions exceeded their CMAX limit. If so, then a replacement is selected from among those ways at step 624. Otherwise, at step 626, it is determined whether the requesting partition has any owned lines. If so, then at step 628, a replacement is selected from those owned lines and otherwise, the previously described bypass behaviour is performed at step 630.

At step 632, if the CMAX value was not exceeded, then it is determined whether the requesting partition has exceeded its CMIN value. If so, then at step 634, it is determined whether there are free lines or ways belonging to any disabled partitions. If so, then at step 636, a replacement is selected from among those free lines or ways. Otherwise, at step 638 it is determined whether there are any ways that belong to partitions exceeded their CMAX limit. If so, then a replacement is selected from those ways or lines at step 640. Otherwise, at step 642, it is determined whether there is any way that belongs to a partition that exceeds its CMIN limit. If so, then at step 644, a replacement is selected from those ways. If not, then at step 646, it is determined whether the requesting partition has any owned lines. If so, then at step 648, a replacement is selected from those owned lines and otherwise, the previously described bypass behaviour is performed at step 650.

At step 652, if the CMIN limit of the requesting partition has not exceeded its CMIN value, it is determined whether there are free lines or ways belonging to disabled partitions. If so then a replacement is chosen from those free lines or ways at step 654. If not, then at step 656 it is determined whether there are any ways that belong to a partition that exceeds its CMAX limit. If so, then a replacement is chosen from one of those ways at step 658. Otherwise, at step 660, it is determined whether there are any ways that belong to a partition that exceeds its CMIN value. If so, then a replacement is selected from one of those ways at step 662. Otherwise, a replacement is selected from any way at step 664.

Thus, preference is given to these unused lines for which the reallocation should have little to no detrimental effect such as in ways or lines that are allocated to unused partitions. As a next highest preference, lines are sacrificed by partitions that already exceed their CMAX allocation. Note that this reallocation occurs regardless of how the requesting partition's resource usage compares to its limits (except that it is under the hard limit). That is, if the requesting partition is also over its CMAX allocation, it is still able to have lines reallocated from another partition that exceeds its CMAX allocation. In both situations, there are partitions exceeding their CMAX allocation so moving lines between these partitions is not seen to be problematic. If the requesting partition has not exceeded its own CMAX allocation then as a next highest preference, lines are sacrificed by other partitions that exceed their CMIN allocation. Again, it is not considered to be problematic to move lines between partitions that exceed their CMIN allocation (and do not exceed their CMAX allocation). If the requesting partition has not even met its CMIN allocation then storage will ultimately be allocated from somewhere for the requesting partition. However, the reallocation scheme again tries to prioritise allocations from unused storage, followed by partitions that exceed their CMAX allocation, followed by partitions that exceed their CMIN allocation. In a worst case scenario, this will reallocate resources from another partition whose CMIN allocation has not been met. However, this is not considered to have a detrimental effect overall, since it merely reallocates lines between two partitions for which neither partition is having its CMIN provided.

In the above description, the values of CMIN and CMAX can all be measured (as previously described) as a percentage of the cache, an absolute number of lines, or an absolute number of ways of the cache. Other forms of measurement that indicate the amount of the cache that is used, will also be aware to the skilled person.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
processing circuitry configured to perform data processing in response to instructions of a software execution environment;
configuration storage circuitry configured to store a set of memory transaction parameters in association with a partition identifier; and
configuration application circuitry configured to apply the set of memory transaction parameters in respect of memory transactions issued by the software execution environment that identifies the partition identifier, wherein
the set of memory transaction parameters comprise a minimum target allocation and a maximum target allocation of a storage capacity of at least part of a memory system in handling the memory transaction that identifies the partition identifier; and
the configuration application circuitry is configured to allocate to the partition identifier, whose usage of a resource is less than its associated minimum target allocation, parts of the resource that are already allocated to another partition identifier when additional parts of the resource are required for handling the memory transaction that identifies the partition identifier and there is no unused resource available.

2. The apparatus according to claim 1, wherein
the memory system comprises a cache; and
the storage capacity is a storage capacity of the cache.

3. The apparatus according to claim 2, wherein
the storage capacity of the cache is a number of ways of the cache that are assigned to be used.

4. The apparatus according to claim 2, wherein
the storage capacity of the cache is a number of lines of the cache that are assigned to be used.

5. The apparatus according to claim 1, wherein
the configuration application circuitry is configured to reserve the minimum target allocation of the resource of each set of memory transaction parameters in the configuration storage circuitry when every minimum target allocation of the resource of each set of memory transaction parameters in the configuration storage circuitry can be met.

6. The apparatus according to claim 1, wherein
the configuration application circuitry is configured to allocate, as a first preference, parts of the resource that are unused when additional parts of the resource are required for handling the memory transaction that identifies the partition identifier.

7. The apparatus according to claim 6, wherein
the set of memory transaction parameters comprise an enable setting; and
parts of the resource that are allocated to another partition identifier whose enable setting indicates that the another partition identifier is disabled are unused.

8. The apparatus according to claim 6, wherein
the configuration application circuitry is configured to allocate, as a second preference lower than the first preference, parts of the resource that are allocated to a further partition identifier whose usage of the resource exceeds its associated maximum target allocation.

9. The apparatus according to claim 8, wherein
the configuration application circuitry is configured to allocate, as a third preference lower than the second preference, parts of the resource that are allocated to a still further partition identifier whose usage of the resource exceeds its associated minimum target allocation and is less than its associated maximum target allocation.

10. The apparatus according to claim 9, wherein
the configuration application circuitry is configured to allocate based on the first preference and the second preference when resource usage by the partition identifier exceeds its associated maximum target allocation; and
the configuration application circuitry is configured to allocate based on the first preference, the second preference, and the third preference when resource usage by the partition identifier is below its associated maximum target allocation.

11. The apparatus according to claim 6, wherein
the configuration application circuitry is configured to allocate, as a final preference, parts of the resource that are already allocated to the partition identifier when additional parts of the resource are required for handling the memory transaction that identifies the partition identifier.

12. The apparatus according to claim 9, wherein
the configuration application circuitry is configured to allocate, as a final preference, parts of the resource that are already allocated to the partition identifier when additional parts of the resource are required for handling the memory transaction that identifies the partition identifier the configuration application circuitry is configured to allocate based on the first preference, the second preference, and the final preference when resource usage by the partition identifier exceeds its associated maximum target allocation; and the configuration application circuitry is configured to allocate based on the first preference, the second preference, the third preference, and the final preference when resource usage by the partition identifier is below its associated maximum target allocation.

13. The apparatus according to claim 1, wherein the set of memory transaction parameters comprise an enable setting; and the configuration application circuitry is configured to inhibit the resource allocations based on the enable setting.

14. The apparatus according to claim 13, wherein the configuration application circuitry is configured to disregard the minimum target allocation of the resource used by the memory system in handling the memory transaction that identifies the partition identifier, in response to the enable setting associated with the partition identifier indicating that the partition identifier is disabled.

15. A method comprising:

performing data processing in response to instructions of a software execution environment;

storing a set of memory transaction parameters in association with a partition identifier; and applying the set of memory transaction parameters in respect of memory transactions issued by the software execution environment that identifies the partition identifier, wherein the set of memory transaction parameters comprise a minimum target allocation and a maximum target allocation of a storage capacity of at least part of a memory system in handling the memory transaction that identifies the partition identifier; and allocating to the partition identifier, whose usage of a resource is less than its associated minimum target allocation, parts of the resource that are already allocated to another partition identifier when additional parts of the resource are required for handling the memory transaction that identifies the partition identifier and there is no unused resource available.

\* \* \* \* \*